United States Patent
Bok et al.

(10) Patent No.: US 11,868,573 B2
(45) Date of Patent: Jan. 9, 2024

(54) ELECTRONIC APPARATUS

(71) Applicant: Samsung Display Co., Ltd., Yongin-Si (KR)

(72) Inventors: Seung-Lyong Bok, Hwaseong-si (KR); Kicheol Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/575,891

(22) Filed: Jan. 14, 2022

(65) Prior Publication Data
US 2022/0261115 A1 Aug. 18, 2022

(30) Foreign Application Priority Data
Feb. 15, 2021 (KR) .................. 10-2021-0020151

(51) Int. Cl.
*G06F 3/044* (2006.01)
*G06F 3/041* (2006.01)
*H04M 1/02* (2006.01)

(52) U.S. Cl.
CPC .......... *G06F 3/0446* (2019.05); *G06F 3/0412* (2013.01); *H04M 1/0266* (2013.01); *G06F 2203/04112* (2013.01); *H04M 2250/22* (2013.01)

(58) Field of Classification Search
CPC .. G06F 2203/04112; G06F 2203/04111; G06F 3/0412; G06F 3/0446
See application file for complete search history.

(56) References Cited

U.S. PATENT DOCUMENTS

| | | | |
|---|---|---|---|
| 10,890,997 B2 | 1/2021 | Kim et al. | |
| 10,969,911 B2 | 4/2021 | Kim et al. | |
| 2014/0253499 A1* | 9/2014 | Lee | G06F 3/0448 345/174 |
| 2019/0346943 A1* | 11/2019 | Kim | G06F 3/0443 |
| 2021/0066427 A1 | 3/2021 | Ma et al. | |
| 2022/0035484 A1* | 2/2022 | Gong | G06F 3/0443 |

FOREIGN PATENT DOCUMENTS

| | | |
|---|---|---|
| CN | 110379356 | 10/2019 |
| CN | 110658952 | 1/2020 |
| KR | 10-2015-0124907 | 11/2015 |
| KR | 10-2020-0039889 | 4/2020 |
| KR | 10-2020-0044264 | 4/2020 |

* cited by examiner

*Primary Examiner* — Robin J Mishler
(74) *Attorney, Agent, or Firm* — F. Chau & Associates, LLC

(57) ABSTRACT

An electronic apparatus including: an electronic module; a display panel including a first region overlapped with the electronic module and a second region adjacent to the first region, a plurality of first emission parts, which are disposed in the first region and are spaced apart from each other, and a plurality of second emission parts, which are disposed in the second region and are spaced apart from each other; and an input sensor including a first electrode, which is disposed on the first region, a second electrode, which is disposed on the second region, a third electrode, which is disposed on the second region and is electrically disconnected from the second electrode, and a plurality of conductive patterns, which are disposed on the second region, wherein the conductive patterns comprise a first pattern, which is electrically connected to the first electrode, and a second pattern, which is electrically floated.

11 Claims, 20 Drawing Sheets

ELECTRONIC APPARATUS

CROSS-REFERENCE TO RELATED APPLICATION

This U.S. non-provisional patent application claims priority under 35 U.S.C. § 119 to Korean Patent Application No. 10-2021-0020151, filed on Feb. 15, 2021, in the Korean Intellectual Property Office, the disclosure of which is incorporated by reference herein in its entirety.

TECHNICAL FIELD

The present disclosure relates to an electronic apparatus, and in particular, to an electronic apparatus configured to sense an external input.

DISCUSSION OF RELATED ART

An electronic apparatus is activated by an electrical signal. The electronic apparatus may be provided in various forms. For example, the electronic apparatus may be one of tablets, laptop computers, computers, smart televisions, and so forth. The electronic apparatus includes devices that are composed of various electronic components (e.g., a display unit for displaying an image or a sensing unit for sensing an external input). The electronic components are electrically connected to each other through signal lines, which are arranged in various manners.

A display panel includes light-emitting devices that are used to produce an image. An input sensor includes sensing electrodes that are used to sense an external input applied to the display panel. The sensing electrodes are disposed in an active region of the display panel. The input sensor may not provide uniform sensitivity throughout the entire active region.

SUMMARY

An embodiment of the inventive concept provides an electronic apparatus which is configured to provide uniform (e.g., position independent) sensitivity to an external input throughout its entire active region.

According to an embodiment of the inventive concept, an electronic apparatus may include: an electronic module; a display panel including a first region overlapped with the electronic module and a second region adjacent to the first region, when viewed in a plan view, the display panel further including a plurality of first emission parts, which are disposed in the first region and are spaced apart from each other, and a plurality of second emission parts, which are disposed in the second region and are spaced apart from each other, and an input sensor including a first electrode, which is disposed on the first region, a second electrode, which is disposed on the second region, a third electrode, which is disposed on the second region and is electrically disconnected from the second electrode, and a plurality of conductive patterns, which are disposed on the second region and are spaced apart from each other, wherein the conductive patterns comprise a first pattern, which is electrically connected to the first electrode, and a second pattern, which is in an electrically floated state.

The first electrode may be electrically connected to the second electrode.

The input sensor may further include a fourth electrode, which is disposed on the first region and is electrically disconnected from the first electrode, and the fourth electrode is electrically connected to the third electrode.

The first electrode and the fourth electrode may cross each other, when viewed in the plan view.

The first emission parts may have a different size from the second emission parts, when viewed in the plan view.

A size of at least one of the first emission parts may be larger than a size of at least one of the second emission parts.

The first emission parts and the second emission parts may have different arrangements.

The first emission parts may be spaced apart from each other in a first direction and a second direction different from the first direction, and the second emission parts may be spaced apart from each other in a third direction, which is different from the first and second directions, and in a fourth direction, which is different from the first, second and third directions.

The electronic apparatus may further include a plurality of transmission parts, which are disposed in the first region and are spaced apart from the first emission parts, and the transmission parts may have a higher transmittance than the first emission parts.

The first electrode may include first mesh lines including a plurality of openings, wherein the openings are overlapped with the first emission parts, respectively, the second electrode may include second mesh lines including a plurality of openings, wherein the openings of the second mesh lines are overlapped with the second emission parts, respectively, and the openings of the first mesh lines may be larger than the openings of the second mesh lines.

A linewidth of each of the first mesh lines may be larger than a linewidth of each of the second mesh lines.

The second electrode may include a first pattern, which is adjacent to the first region, and a second pattern, which is spaced apart from the first region and has an area larger than the first pattern, and a plurality of cut portions may be included in the second pattern but not in the first pattern.

According to an embodiment of the inventive concept, an electronic apparatus may include: an electronic module; a display panel including a first region overlapped with the electronic module and a second region adjacent to the first region, when viewed in a plan view, the display panel further including a plurality of first emission parts, which are disposed in the first region and are spaced apart from each other, and a plurality of second emission parts, which are disposed in the second region and are spaced apart from each other; and an input sensor including a first conductive pattern, which is disposed on the first region, a second conductive pattern, which is disposed on the second region, and a third conductive pattern, which is disposed on the second region and is spaced apart from the second conductive pattern, wherein the third conductive pattern includes a first pattern, which is connected to the first conductive pattern, and a second pattern, which is electrically disconnected from the first and second conductive patterns.

The second conductive pattern may include a plurality of first sensing parts, a plurality of first connecting portions electrically connecting the first sensing parts to each other, a plurality of second sensing parts electrically disconnected from the first sensing parts, and a plurality of second connecting portions disposed on a layer, which is different from a layer on which the first connecting portions are disposed, to connect the second sensing parts to each other, and the first conductive pattern may be disposed on the same layer as the first connecting portions or the second connecting portions.

The first conductive pattern may include a third pattern and a fourth pattern, which are spaced apart from each other, the third pattern is electrically connected to one of the first sensing parts, and the fourth pattern is electrically connected to one of the second sensing parts.

The first pattern may include a plurality of first patterns, which are connected to the third pattern and the fourth pattern, respectively.

The third pattern may be connected to the first sensing part through the first pattern, and the fourth pattern may be electrically disconnected from the second pattern of the third conductive pattern.

The third pattern and the fourth pattern may have different areas from each other.

Each of the first and second conductive patterns may include a plurality of mesh lines including a plurality of openings, and a size of the openings, which are included in the mesh lines of the first conductive pattern, may be larger than a size of the openings, which are included in the mesh lines of the second conductive pattern.

A linewidth of each of the mesh lines of the first conductive pattern may be larger than a linewidth of each of the mesh lines of the second conductive pattern.

According to an embodiment of the inventive concept, an electronic apparatus may include: an electronic module; a display panel including a first region overlapped with the electronic module and a second region adjacent to the first region; and an input sensor including a first conductive pattern disposed in the first region and second conductive pattern disposed in the second region, the second conductive pattern including a first pattern and a second pattern, the first pattern being connected to the first conductive pattern and the second pattern being disconnected from the first conductive pattern.

The first pattern of the second conductive pattern may be disposed between the first conductive pattern and a sensing pattern of a third conductive pattern.

The first pattern of the second conductive pattern may be connected to the sensing pattern of the third conductive pattern.

The second pattern of the second conductive pattern may be surrounded by a sensing pattern of a third conductive pattern.

The sensing pattern of the third conductive pattern may be disposed in the second region.

BRIEF DESCRIPTION OF THE DRAWINGS

Example embodiments of the inventive concept will be more clearly understood from the following detailed description taken in conjunction with the accompanying drawings. The accompanying drawings represent non-limiting, example embodiments of the inventive concept.

Figure 1:
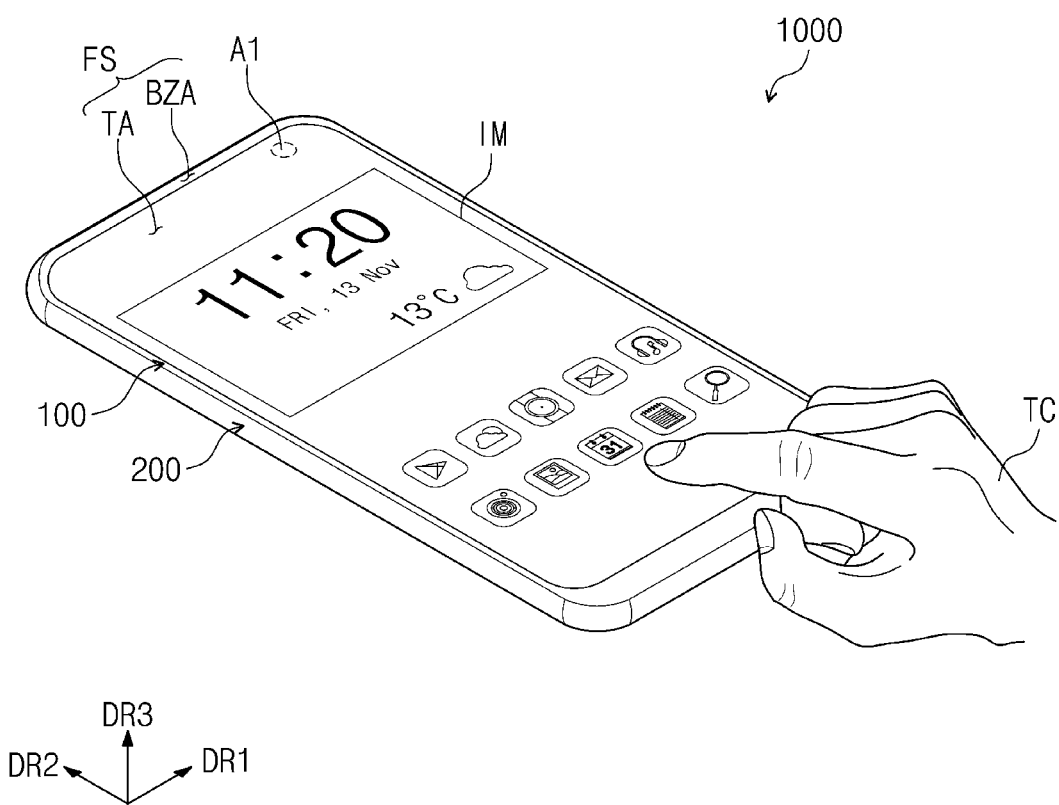
FIG. 1 is a perspective view illustrating an electronic apparatus according to an embodiment of the inventive concept.

It should be noted that these figures illustrate the general characteristics of methods, structure and/or materials utilized in certain example embodiments and supplement the detailed description provided below. These drawings are not, however, to scale and may not precisely reflect the precise structural or performance characteristics of any given embodiment, and thus, should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings indicate the presence of a similar or identical element or feature.

DETAILED DESCRIPTION OF THE EMBODIMENTS

Example embodiments of the inventive concept will now be described more fully with reference to the accompanying drawings. Example embodiments of the inventive concept may, however, be embodied in many different forms and should not be construed as being limited to the embodiments set forth herein.

It will be understood that when an element is referred to as being "connected" or "coupled" to another element, it can be directly connected or coupled to the other element or intervening elements may be present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative terms used herein are interpreted accordingly.

The terminology used herein is for the purpose of describing particular embodiments and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concept are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concept belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2A:
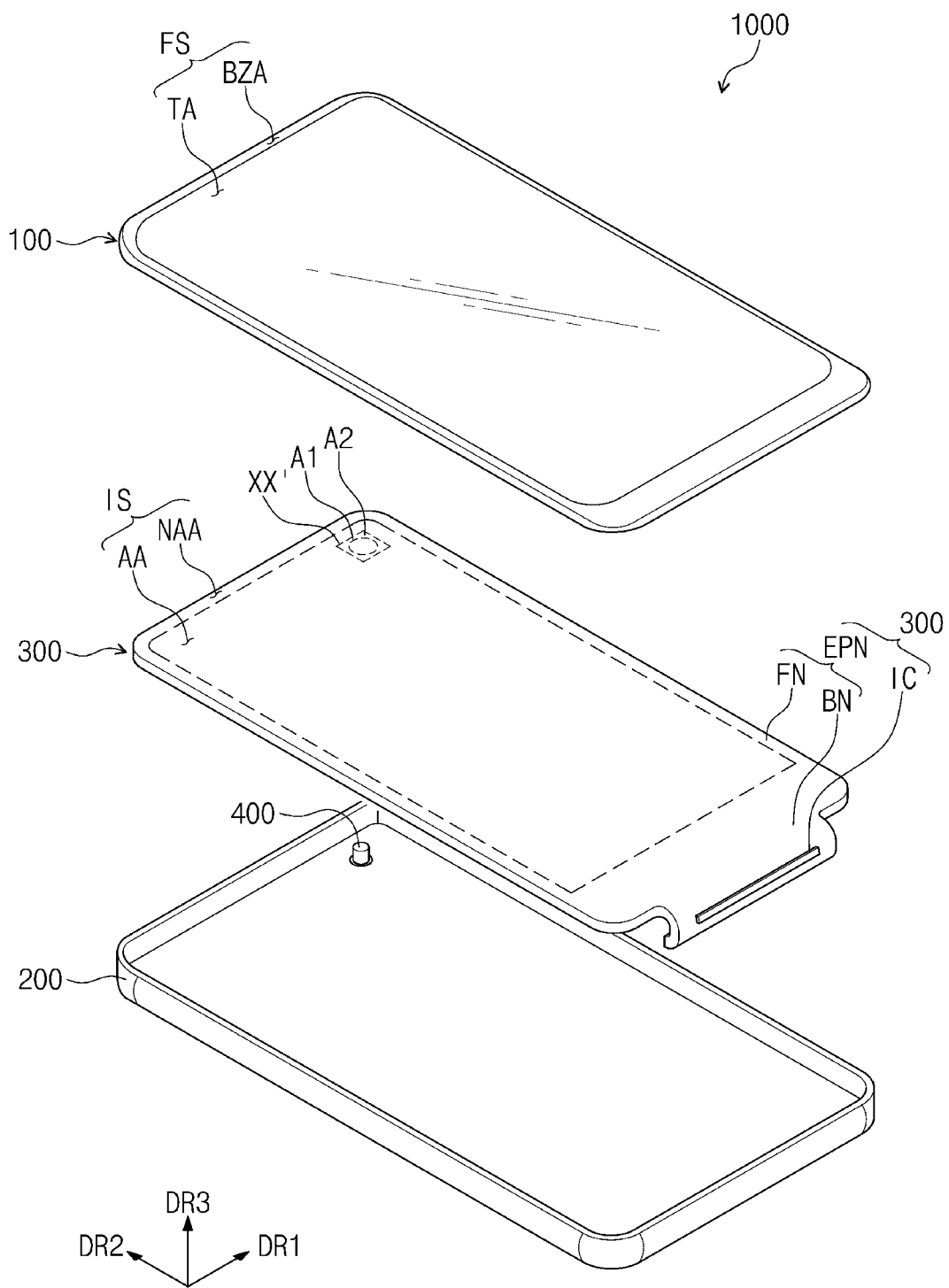
FIG. 2A is an exploded perspective view illustrating an electronic apparatus according to an embodiment of the inventive concept.
Figure 2B:
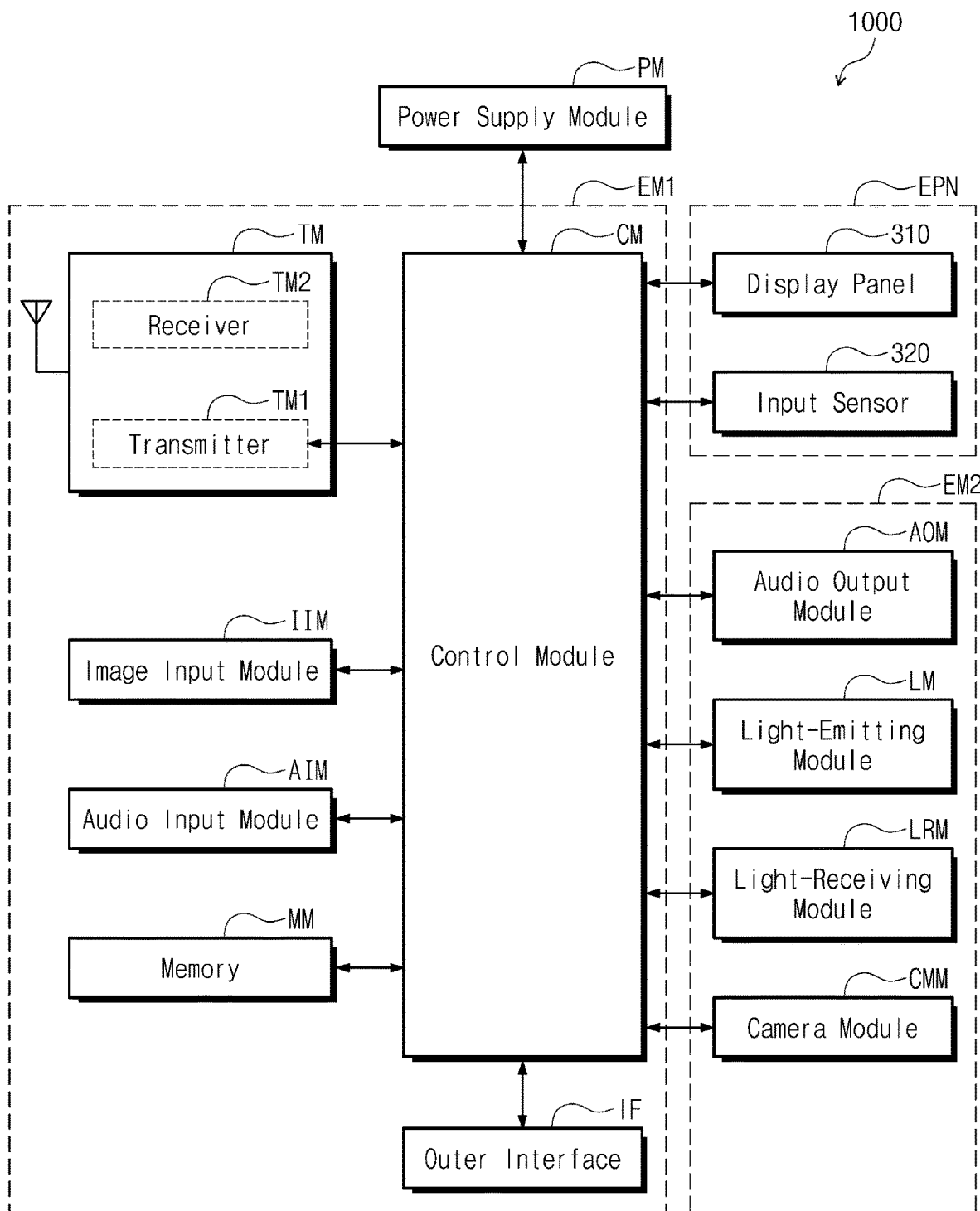
FIG. 2B is a block diagram illustrating an electronic apparatus according to an embodiment of the inventive concept.

FIG. 1 is a perspective view illustrating an electronic apparatus according to an embodiment of the inventive concept. FIG. 2A is an exploded perspective view illustrating an electronic apparatus according to an embodiment of the inventive concept. FIG. 2B is a block diagram illustrating an electronic apparatus according to an embodiment of the inventive concept. Hereinafter, an embodiment of the inventive concept will be described with reference to FIGS. 1, 2A, and 2B.

An electronic apparatus 1000 may be a device that is activated by an electrical signal applied thereto. The electronic apparatus 1000 may be provided in various forms. For example, the electronic apparatus 1000 may be one of computers (e.g., tablets, laptop computers), smart televisions, and so forth. In the present embodiment, the electronic apparatus 1000 may be a smart phone, as illustrated in FIGS. 1, 2A, and 2B.

The electronic apparatus 1000 may display an image IM on a display surface IS, which is parallel to two different directions (e.g., a first direction DR1 and a second direction DR2) and is perpendicular to a third direction DR3. The display surface IS, on which the image IM is displayed, may correspond to a front surface of the electronic apparatus 1000 and may correspond to a front surface FS of a window member 100. Hereinafter, the display or front surface of the electronic apparatus 1000 and the front surface of the window member 100 may be indicated using the same reference number, e.g., FS. The image IM may be a video image or a still image. In FIG. 1, a clock widget and a plurality of application icons are displayed as parts of the image IM.

In the present embodiment, a front or top surface and a rear or bottom surface of each element may depend on the display direction of the image IM. The front surface and the rear surface may be opposite to each other in the third direction DR3, and a direction normal to each of the front and rear surfaces may be parallel to the third direction DR3. A distance between the front surface and the rear surface in the third direction DR3 may correspond to a thickness of a display panel 310 in the third direction DR3. In the present specification, directions indicated by the first to third directions DR1, DR2, and DR3 may be relative concepts, and in certain embodiments, they may be changed to indicate other directions. Hereinafter, the first to third directions may be directions indicated by the reference numbers DR1, DR2, and DR3, respectively, and will be designated by these reference numbers.

The electronic apparatus 1000 according to an embodiment of the inventive concept may sense a user's input TC provided from the outside. The user's input TC may include various types of external inputs, such as a part of a user's body, light, heat, or pressure. In the present embodiment, the user's input TC may be input to the front surface through a user's hand, as shown in FIG. 1. However, this is just an example, and the user's input TC may be provided in various forms, as described above. Furthermore, according to the structure of the electronic apparatus 1000, the electronic apparatus 1000 may be configured to sense the user's input TC, which is applied through a side or rear surface of the electronic apparatus 1000, but the inventive concept is not limited to this example or a specific embodiment.

In the present embodiment, a first region A1 may be overlapped with a transmission region TA. The first region A1 may be provided in a display module 300 to be described below and may be overlapped with the display module 300 when viewed in a plan view. The electronic apparatus 1000 may receive an external signal, which will be processed by an electronic module 400, through the first region A1 or may provide signals, which are output from the electronic module 400, to the outside through the first region A1. According to an embodiment of the inventive concept, since the first region A1 is overlapped with the transmission region TA, an area of a bezel region BZA may be reduced. This will be described in more detail below.

Referring to FIG. 2A, the electronic apparatus 1000 may further include a housing unit 200, in addition to the window member 100, the display module 300, and the electronic module 400 mentioned above. In the present embodiment, the window member 100 and the housing unit 200 may be combined to each other to define an outer appearance of the electronic apparatus 1000.

The window member 100 may include an insulating panel. For example, the window member 100 may be formed of or include at least one of glass, and plastic materials.

The front surface FS of the window member 100 may define the front surface of the electronic apparatus 1000, as described above. The transmission region TA may be an optically transparent region. For example, the transmission region TA may be a region whose transmittance to a visible light is about 90% or higher.

The bezel region BZA may have relatively low optical transmittance, compared with the transmission region TA. The bezel region BZA may define a shape of the transmission region TA. In other words, the transmission region TA may be demarcated by the bezel region BZA. The bezel region BZA may be provided adjacent to the transmission region TA to surround the transmission region TA.

The bezel region BZA may have a predetermined color. The bezel region BZA may be formed by a bezel layer, which is distinct from a transparent substrate forming the transmission region TA, or by an ink layer, which is inserted in the transparent substrate or is formed by coloring the transparent substrate.

The bezel region BZA may cover a peripheral region NAA of the display module 300 and thereby to prevent the peripheral region NAA from being recognized by a user. This is just an example, and in an embodiment, the bezel region BZA may be omitted from the window member 100.

The display module 300 may include an electronic panel EPN and a driving circuit IC.

The electronic panel EPN may display the image IM and sense the external input TC (which may be the user's input TC described above). The display surface IS of the electronic panel EPN may include an active region AA and a peripheral region NAA. The active region AA may be a region that is activated by an electrical signal. The display surface IS of the electronic panel EPN may be a front surface of the electronic panel EPN.

In the present embodiment, the active region AA may be a region, which is used to display the image IM and to sense the external input TC. The active region AA may be a region, in which a plurality of emission parts to be described below are disposed.

The transmission region TA may be overlapped with the active region AA at least. For example, the transmission region TA may be overlapped with a front surface of the active region AA or at least a portion of the front surface of the active region AA. Thus, a user may recognize the image IM through the transmission region TA or may provide the external input TC through the transmission region TA. However, this is just an example, and the active region AA may include, for example, two separate regions which are respectively used to display the image IM and to sense the external input TC, but the inventive concept is not limited to these examples.

The peripheral region NAA may be covered with the bezel region BZA. The peripheral region NAA may be adjacent to the active region AA. The peripheral region NAA may surround the active region AA. The peripheral region NAA may be a region that is not used to display the image IM. A driving circuit or a driving line, which is used to drive the active region AA, may be provided in the peripheral region NAA.

In the present embodiment, the electronic panel EPN may be in a flat state, in which the active region AA and the peripheral region NAA face the window member 100, when it is assembled. However, this is just an example, and a portion of the peripheral region NAA of the electronic panel EPN may be in a bent state. For example, the portion of the peripheral region NAA, which is in the bent state, may be provided toward the rear surface of the electronic apparatus 1000, and in this case, the bezel region BZA, which is seen through the front surface of the electronic apparatus 1000, may be reduced. In an embodiment, when the electronic panel EPN is assembled, a portion of the active region AA may be in a bent state. In an embodiment, the peripheral region NAA may be omitted from the electronic panel EPN.

The active region AA may further include a second region A2 (see FIG. 3A), in addition to the first region A1. The first region A1 may have a relatively high transmittance, compared with the second region A2. The first region A1 may be provided in a region that is overlapped with the electronic module 400 when viewed in a plan view. In the present embodiment, the first region A1 has a circular shape, but the shape of the first region A1 may not be limited to this example and may be changed to one of various shapes (e.g., a polygon, an ellipse, and a shape with at least one curved side).

The second region A2 (see FIG. 3A) may be adjacent to the first region A1. In the present embodiment, the second region A2 is illustrated to have a shape fully surrounding the first region A1. For example, the second region A2 may be provided between the first region A1 and a region XX'. However, this is just an example, and the shape of the second region A2 may not be limited to this example and may be adjacent to only a portion of an edge of the first region A1.

Referring to FIGS. 1, 2A and 2B, the electronic panel EPN may include a display panel 310 and an input sensor 320. The display panel 310 may be an element that is configured to substantially produce the image IM. The image IM, which is produced by the display panel 310, may be displayed on the display surface IS and may be recognized by a user through the transmission region TA.

The input sensor 320 may sense the external input TC, which is applied from the outside. As described above, the input sensor 320 may sense the external input TC provided to the window member 100.

Referring to FIG. 2A, the electronic panel EPN may include a flat portion FN and a bending portion BN. The flat portion FN may be in a flat state (e.g., parallel to a plane formed by the first and second directions DR1 and DR2), when the flat portion FN is assembled. The active region AA may be provided in the flat portion FN.

The bending portion BN may be extended from the flat portion FN to have a bent shape. The bending portion BN may be assembled such that it is bent from the flat portion FN and is located on a rear surface of the flat portion FN. Since, in the step of assembling the bending portion BN, the bending portion BN is overlapped with the flat portion FN in a plan view, an area of the bezel region BZA of the electronic apparatus 1000 may be reduced. However, this is just an example, and in an embodiment, the bending portion BN may be omitted from the electronic panel EPN.

The driving circuit IC may be mounted on the bending portion BN. The driving circuit IC may be provided in the form of a chip, as shown in FIG. 2A, but the inventive concept is not limited to this example. For example, in an embodiment, the driving circuit IC may be provided on another circuit board and may be electrically connected to the electronic panel EPN through a flexible film or the like.

The driving circuit IC may be electrically connected to the active region AA and may be used to provide electrical signals to the active region AA. For example, the driving circuit IC may include a data driving circuit and may provide data signals to pixels, which are disposed in the active region AA. Alternatively, the driving circuit IC may include a touch driving circuit and may be electrically connected to the input sensor 320 disposed in the active region AA. However, this is just an example, and the inventive concept is not limited to this example. For example, the driving circuit IC may include various other circuits, which are different from the afore-described circuits, or may be designed to provide various other electrical signals to the active region AA.

The electronic apparatus 1000 may further include a main circuit board, which is electrically connected to the electronic panel EPN and the driving circuit IC. The main circuit board may include various driving circuits, which are used to drive the electronic panel EPN, or connectors, which are used to supply an electric power to the electronic panel EPN. The main circuit board may be a rigid printed circuit board (PCB), but the inventive concept is not limited to this example. For example, in an embodiment, the main circuit board may be a flexible circuit board.

The electronic module 400 may be disposed below the window member 100. The electronic module 400 may be overlapped with the first region A1 when viewed in a plan view. The electronic module 400 may receive an external input, which is transmitted through the first region A1, or may output a signal to the outside through the first region A1. In an embodiment, since the first region A1 having relatively high transmittance is provided in the active region AA, the electronic module 400 may be overlapped with the active region AA. Accordingly, it is possible to prevent an area of the bezel region BZA from being increased.

Referring to FIG. 2B, the electronic apparatus 1000 may further include a power supply module PM, a first electronic module EM1, and a second electronic module EM2, in addition to the display module 300 (see FIG. 2A). The display module 300, the power supply module PM, the first electronic module EM1, and the second electronic module EM2 may be electrically connected to each other. In FIG. 2B, the display panel 310 and the input sensor 320 are illustrated as example elements constituting the display module 300.

The power supply module PM may supply an electric power to the electronic apparatus 1000. The power supply module PM may include a battery module.

The first electronic module EM1 and the second electronic module EM2 may include various functional modules, which are used to operate the electronic apparatus 1000. The first electronic module EM1 may be directly mounted on a motherboard electrically connected to the electronic panel EPN. Alternatively, the first electronic module EM1 may be mounted on another substrate and may be electrically connected to the motherboard through a connector or the like.

The first electronic module EM1 may include a control module CM, a wireless communication module TM, an image input module IIM, an audio input module AIM, a memory MM, and an outer interface IF. At least one of the modules may not be mounted on the motherboard and may be electrically connected to the motherboard through a flexible circuit board.

The control module CM may control overall operations of the electronic apparatus 1000. The control module CM may be a micro-processor. For example, the electronic apparatus 1000 may be activated or deactivated under the control of the control module CM. The control module CM may control other modules, such as the image input module HM or the audio input module AIM, based on a touch signal received from the electronic panel EPN.

The wireless communication module TM may be configured to transmit and receive a wireless signal to and from another terminal via a Bluetooth or a Wi-Fi line. In an embodiment, the wireless communication module TM may be configured to transmit and receive a voice signal via a communication line. The wireless communication module TM may include a transmitter TM1, which is configured to modulate and transmit a signal to be transmitted, and a receiver TM2, which is configured to demodulate the received signal.

The image input module IIM may process an image signal and convert it into image data that can be displayed on the electronic panel EPN. The audio input module AIM may receive an external audio signal through a microphone in a recording mode, a voice recognizing mode, and so forth, and then convert the external audio signal into electrical audio data.

The outer interface IF may serve as an interface that is connected to an external charger, a wired/wireless data port, a card socket (e.g., a socket for a memory card or a subscriber identity module (SIM)/user identity module (UIM) card), and so forth.

The second electronic module EM2 may include an audio output module AOM, a light-emitting module LM, a light-receiving module LRM, a camera module CMM, and so forth. The modules of the second electronic module EM2 may be directly mounted on a motherboard. Alternatively, the modules of the second electronic module EM2 may be mounted on another substrate and may be electrically connected to the electronic panel EPN or the first electronic module EM1 through a connector or the like.

The audio output module AOM may be configured to convert audio data, which are transmitted from the wireless communication module TM or are stored in the memory MM, and to output the converted audio data to the outside.

The light-emitting module LM may generate and emit light. In an embodiment, the light-emitting module LM may be configured to emit infrared light. The light-emitting module LM may include a light-emitting diode (LED) device. The light-receiving module LRM may be configured to sense the infrared light. The light-receiving module LRM may be activated, when an infrared light to be incident thereto has an intensity higher than a reference value. The light-receiving module LRM may include a complementary metal-oxide-semiconductor (CMOS) sensor. The infrared light emitted from the light-emitting module LM may be reflected by an external object (e.g., a user's finger or face) and may be incident into the light-receiving module LRM. The camera module CMM may be used to obtain an image of the external object.

The electronic module 400 according to an embodiment of the inventive concept may include at least one of the modules or components of the second electronic module EM2. For example, the electronic module 400 may include at least one of a camera, a speaker, a light sensing sensor, and a heat sensing sensor. The electronic module 400 may sense a signal on an external subject, which is received through the first region A1, or may provide a sound signal (e.g., a voice) to the outside through the first region A1. Further, the electronic module 400 may include a plurality of components, but the inventive concept is not limited to this example. In an embodiment, the electronic module 400 may be adhered to the electronic panel EPN by an additional adhesive agent.

Referring back to FIG. 2A, the housing unit 200 may be combined with the window member 100. In an embodiment, the housing unit 200 may be combined with the window member 100 to define an internal space therebetween. The display module 300 and the electronic module 400 may be contained in the internal space.

The housing unit 200 may include a material having a relatively high strength or stiffness. For example, the housing unit 200 may include at least one of glass, plastic, and metallic materials or may include a plurality of frames and/or plates that are made of the glass, plastic, or metallic materials. The housing unit 200 may be configured to stably protect the elements of the electronic apparatus 1000, which are contained in the internal space, from an external impact.

Figure 3A:
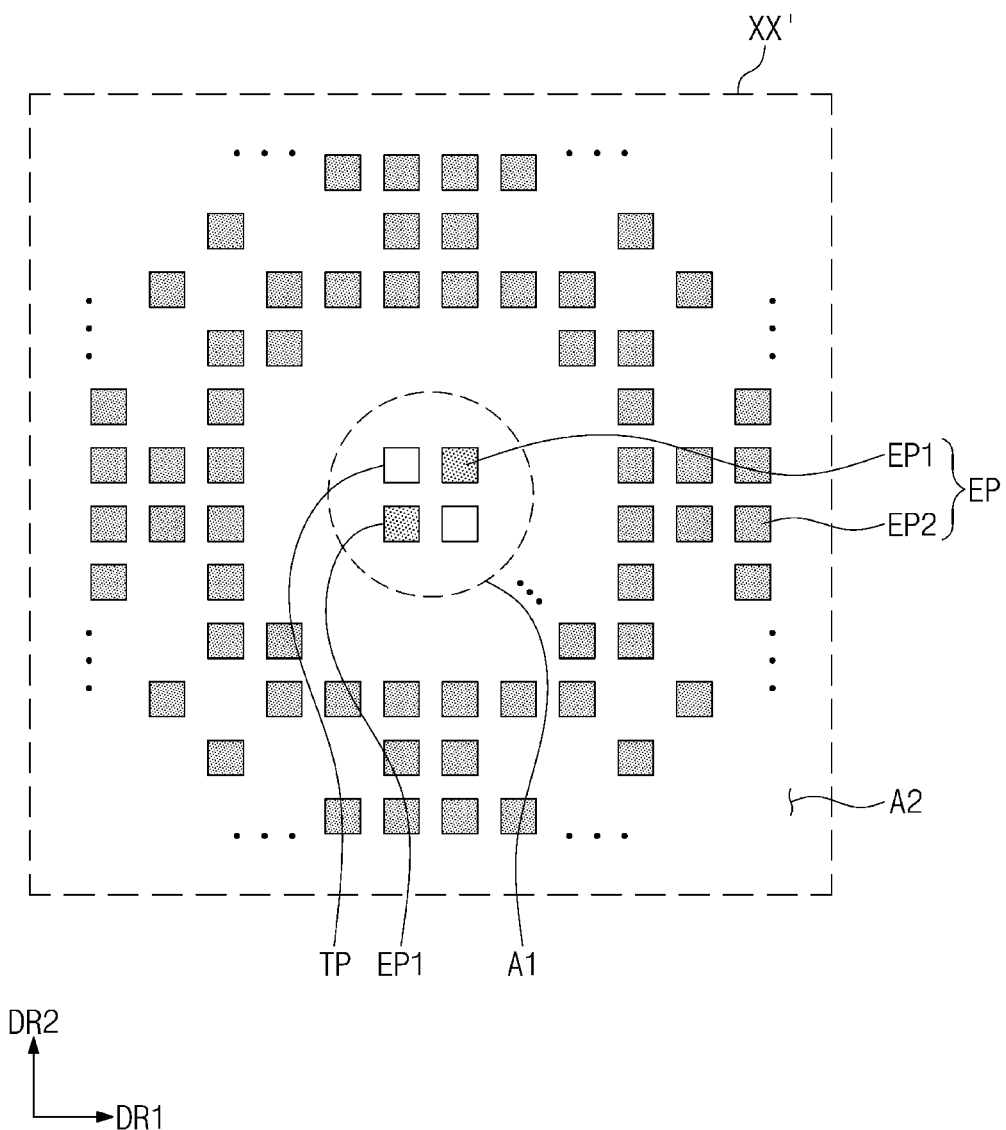
FIG. 3A is a plan view illustrating a region XX' of an electronic panel shown in FIG. 2A.
Figure 3B:
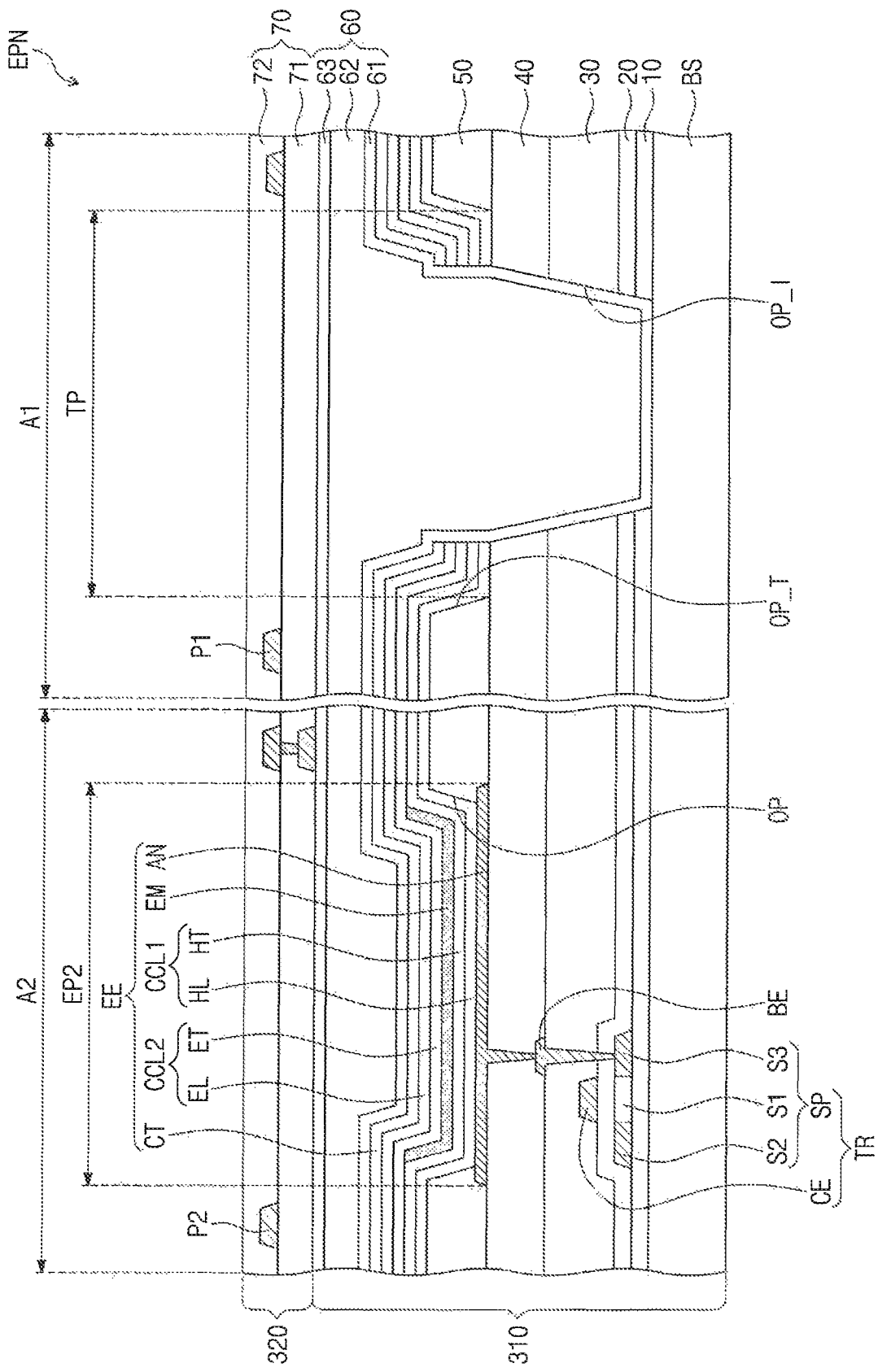
FIG. 3B is a sectional view illustrating portions of regions A1 and A2 of an electronic panel shown in FIG. 3A.

FIG. 3A is a plan view illustrating a region XX' of an electronic panel shown in FIG. 2A. FIG. 3B is a sectional view illustrating portions of regions A1 and A2 of an electronic panel shown in FIG. 3A. FIG. 3A illustrates a region XX' of the active region AA (e.g., see FIG. 2A), and FIG. 3B illustrates a portion of the first region A1 and a portion of the second region A2. Hereinafter, an embodiment of the inventive concept will be described with reference to FIGS. 3A and 3B.

The electronic panel EPN may include an emission part EP and a transmission part TP. The emission part EP may have a planar shape corresponding to a light-emitting area, which corresponds to one light-emitting device EE, and in the present embodiment, it is illustrated with a rectangular shape. A plurality of the emission parts EP may be provided to be spaced apart from each other in the active region AA.

The emission part EP may include a first emission part EP1 and a second emission part EP2. The first and second emission parts EP1 and EP2 may be two portions of the emission part EP, which are disposed in the first and second regions A1 and A2, respectively. In the present embodiment, the emission part EP has a rectangular shape, when viewed in a plan view, but the inventive concept is not limited to this example. For example, the planar shape of the emission part EP may be changed to one of various shapes (e.g., polygonal, circular, and elliptical shapes). In addition, the first emission part EP1 and the second emission part EP2 are illustrated to have the same shape, but the inventive concept is not limited to this example. For example, the first and second emission parts EP1 and EP2 may have different shapes from each other.

The transmission part TP may be disposed in the first region A1. A plurality of the transmission parts TP, which are provided to be spaced apart from each other in the first region A1, are illustrated in the present embodiment. For example, in FIG. 3A, two transmission parts TP are provided in the first region A1. However, this is just an example, and in an embodiment, the transmission part TP may be a single object that is provided in the first region A1. In addition, a planar shape of the transmission part TP is illustrated to have a rectangular shape corresponding to the emission part EP, but the inventive concept is not limited to this example. For example, the transmission part TP may have other planar shape that is independent of the emission part EP.

A sectional structure of the electronic panel EPN will be described in more detail with reference to FIG. 3B. For convenience in illustration, a portion of the electronic panel EPN (e.g., a portion of the first region A1 provided with the transmission part TP and a portion of the second region A2 provided with the second emission part EP2 (hereinafter, an emission part)) is illustrated in FIG. 3B.

The electronic panel EPN may include the display panel 310 and the input sensor 320. In the present embodiment, the input sensor 320 may be stacked on the display panel 310. The display panel 310 may include a base substrate BS, a plurality of insulating layers 10, 20, 30, 40, 50, and 60, the emission part EP2, and the transmission part TP.

The base substrate BS may have an optically transparent property and an electrically insulating property. In an embodiment, the base substrate BS may be a multi-layered structure including at least one of a glass layer, a plastic layer, a polymer film, an organic layer, and an inorganic layer.

The insulating layers 10, 20, 30, 40, 50, and 60 may include first, second, third, fourth, fifth and sixth insulating layers 10, 20, 30, 40, 50, and 60, which are stacked on the base substrate BS. Each of the first to sixth insulating layers 10, 20, 30, 40, 50, and 60 may be an organic layer or an inorganic layer. The display panel 310 may further include an additional insulating layer, besides the six insulating layers, but the inventive concept is not limited to this example or a specific embodiment.

The emission part EP may include a light-emitting device EE and a thin film transistor TR. The thin film transistor TR may include a semiconductor pattern SP and a control electrode CE. The control electrode CE may be a gate electrode of the thin film transistor TR. The semiconductor pattern SP may be disposed between the first insulating layer 10 and the second insulating layer 20.

The semiconductor pattern SP may include a channel portion S1, an input portion S2, and an output portion S3. The channel portion S1, the input portion S2, and the output portion S3 may be three different portions of the semiconductor pattern SP, when viewed in a plan view. The channel portion S1 may have lower conductivity than the input and output portions S2 and S3.

In the present embodiment, the input and output portions S2 and S3 may include a reduced metal. The input and output portions S2 and S3 may be used as source and drain electrodes of the thin film transistor TR, respectively. However, this is just an example, and the inventive concept is not limited to this example. For example, the thin film transistor TR may further include additional source and drain electrodes, which are in contact with the input and output portions S2 and S3, respectively.

The control electrode CE may have a conductive property. The control electrode CE may be spaced apart from the semiconductor pattern SP with the second insulating layer 20 interposed therebetween. The control electrode CE may be overlapped with the channel portion S1 of the semiconductor pattern SP, when viewed in a plan view.

The light-emitting device EE may be disposed over the thin film transistor TR. In the present embodiment, the light-emitting device EE may be disposed on the fourth insulating layer and may be coupled to the thin film transistor TR through a separate connection element (e.g., a connection electrode BE). The connection electrode BE may penetrate the second and third insulating layers 20 and 30 and may be coupled to the output portion S3 of the thin film transistor TR, and the light-emitting device EE may penetrate the fourth insulating layer 40 and may be coupled to the connection electrode BE. However, this is just an example, and the inventive concept is not limited to this example. For example, in the display panel 310 according to an embodiment of the inventive concept, the connection electrode BE may be located at another position or may be omitted.

The light-emitting device EE may include a first electrode AN, a second electrode CT, a light-emitting pattern EM, and charge control layers CCL1 and CCL2. The charge control layers CCL1 and CCL2 may include a first charge control layer CCL1 and a second charge control layer CCL2.

The first electrode AN may be disposed between the fourth insulating layer 40 and the fifth insulating layer 50. At least a portion of the first electrode AN may be exposed through a first opening OP, which is provided in the fifth insulating layer 50. The first electrode AN may be the portion of the light-emitting device EE coupled to the connection electrode BE.

The light-emitting pattern EM may be disposed in the first opening OP and may be overlapped with the first electrode AN. The light-emitting pattern EM may be formed of or include at least one of low-molecular organic light emitting materials, high-molecular organic light emitting materials, fluorescent materials, and phosphorescent materials. Alternatively, the light-emitting pattern EM may include an inorganic light-emitting material (e.g., quantum dots, nanorods, micro-LEDs, and nano-LEDs). Various light-emitting materials may be used in an embodiment of the inventive concept, as long as they allow light emission in the light-emitting device EE, and the inventive concept is not limited to a specific embodiment.

The second electrode CT may be disposed on the light-emitting pattern EM to face the first electrode AN. The second electrode CT may be a single object that is formed throughout the front surface of the display panel 310. This is just an example, and the inventive concept is not limited to this example. For example, the second electrode CT may be a plurality of patterns formed for each emission part EP, similar to the first electrode AN.

The first charge control layer CCL1 may be disposed between the first electrode AN and the light-emitting pattern EM. The first charge control layer CCL1 may include a hole injection region or hole injection layer HL and a hole transport region or hole transport layer HT. The first charge control layer CCL1 may be a common layer, which is formed over the entire front surface of the display panel 310 using an open mask.

The second charge control layer CCL2 may be disposed between the light-emitting pattern EM and the second electrode CT. The second charge control layer CCL2 may be located above the first charge control layer CCL1. The second charge control layer CCL2 may include an electron injection region or electron injection layer EL and an electron transport region or electron transport layer ET. The second charge control layer CCL2 may be a common layer, which is formed over the entire front surface of the display panel 310 using an open mask.

The transmission part TP may be spaced apart from the first and second emission parts EP1 and EP2, when viewed in a plan view. The transmission part TP may be defined by a second opening OP_T, which is provided in the fifth insulating layer 50. The second opening OP_T may be formed in the first region A1 and may be spaced apart from the first opening OP.

The first to fifth insulating layers 10, 20, 30, 40, and 50 and layers constituting the light-emitting device EE may be removed from a region corresponding to the transmission part TP. An opening OP_I may be formed in the first to fourth insulating layers 10, 20, 30, and 40 to expose the base substrate BS, and then, the transmission part TP, which has higher transmittance than the emission part EP2, may be formed by removing the first electrode AN, the light-emitting pattern EM, the second electrode CT, and charge control layers CCL1 and CCL2 from the opening OP_I. In the present embodiment, since the first to fifth insulating layers 10, 20, 30, 40, and 50 and layers constituting the light-emitting device EE are removed through the openings OP_I and OP_T, the transmission part TP may have relatively high transmittance, compared with the second emission part EP2. However, this is just an example, and the inventive concept is not limited to this example. For example, the transmission part TP may further include a portion of the first and second charge control layers CCL1 and CCL2, as long as the transmission part TP has higher transmittance than the second emission part EP2.

The sixth insulating layer 60 may be disposed on the fifth insulating layer 50 to cover the first region A1 and the second region A2. The sixth insulating layer 60 may be used as an encapsulation layer. The sixth insulating layer 60 may include a first inorganic layer 61, an organic layer 62, and a second inorganic layer 63. However, the inventive concept is not limited to this example, and in an embodiment, the sixth insulating layer 60 may further include a plurality of inorganic layers and a plurality of organic layers.

The first inorganic layer 61 may cover the second electrode CT. In addition, the first inorganic layer 61 may cover inner surfaces of the openings OP_T and OP_I in the first region A1. The first inorganic layer 61 may prevent external moisture or oxygen from infiltrating the light-emitting device EE. For example, the first inorganic layer 61 may be formed of or include at least one of silicon nitride, silicon oxide, and silicon oxynitride. The first inorganic layer 61 may be formed by a deposition process.

The organic layer 62 may be disposed on the first inorganic layer 61 and may be in contact with the first inorganic layer 61. On the first inorganic layer 61, the organic layer 62 may be provided to have a flat surface. The organic layer 62 may cover an uneven structure, particles, or the like, which are present on the first inorganic layer 61, and thus, it is possible to prevent elements, which are formed on the organic layer 62, from being affected by a surface state of the top surface of the first inorganic layer 61.

Accordingly, the first region A1 or the second region A2 may have a top surface that is substantially flat, like the organic layer 62. In addition, the organic layer 62 may relieve a stress between a plurality of layers, which are in contact with the organic layer 62. The organic layer 62 may be formed of or include at least one of organic materials and may be formed by a solution process (e.g., a spin coating process, a slit coating process, or an inkjet process).

The second inorganic layer 63 may be disposed on the organic layer 62 to cover the organic layer 62. The second inorganic layer 63 may be stably formed on a relatively flat surface, compared with the case that it is disposed on the first inorganic layer 61. The second inorganic layer 63 may encapsulate the organic layer 62 and may prevent moisture in the organic layer 62 from being leaked to the outside. The second inorganic layer 63 may be formed of or include at least one of silicon nitride, silicon oxide, and silicon oxynitride. The second inorganic layer 63 may be formed by a deposition process.

The input sensor 320 may be formed on the sixth insulating layer 60. For example, the input sensor 320 may be formed on the second inorganic layer 63. The input sensor 320 may include a plurality of conductive patterns P1 and P2 and seventh insulating layer 70. The seventh insulating layer 70 may include a first sensing insulating layer 71 and a second sensing insulating layer 72.

Each of the conductive patterns P1 and P2 may have a conductive property. The conductive patterns P1 and P2 may constitute sensing electrodes, which will be described below. Each of the conductive patterns P1 and P2 may be provided on a single layer (e.g., a layer disposed between the first sensing insulating layer 71 and the second sensing insulating layer 72) or on a plurality of layers (e.g., over the sixth insulating layer 60 and on the first sensing insulating layer 71), but the inventive concept is not limited to this example or a specific embodiment.

In the present embodiment, the conductive patterns P1 and P2 may not be overlapped with the transmission part TP and the second emission portion EP2. In other words, the conductive patterns P1 and P2 may not be present in areas corresponding to the transmission part TP and the second emission part EP2. Accordingly, even when the conductive patterns P1 and P2 are optically opaque, they may not affect a light emission process in the second emission part EP2 or an optical transmittance property of the transmission part TP. However, this is just an example, and the inventive concept is not limited to this example or a specific embodiment. For example, if the conductive patterns P1 and P2 are optically transparent, the conductive patterns P1 and P2 may be overlapped with the transmission part TP or the second emission part EP2 when viewed in a plan view.

Figure 4A:
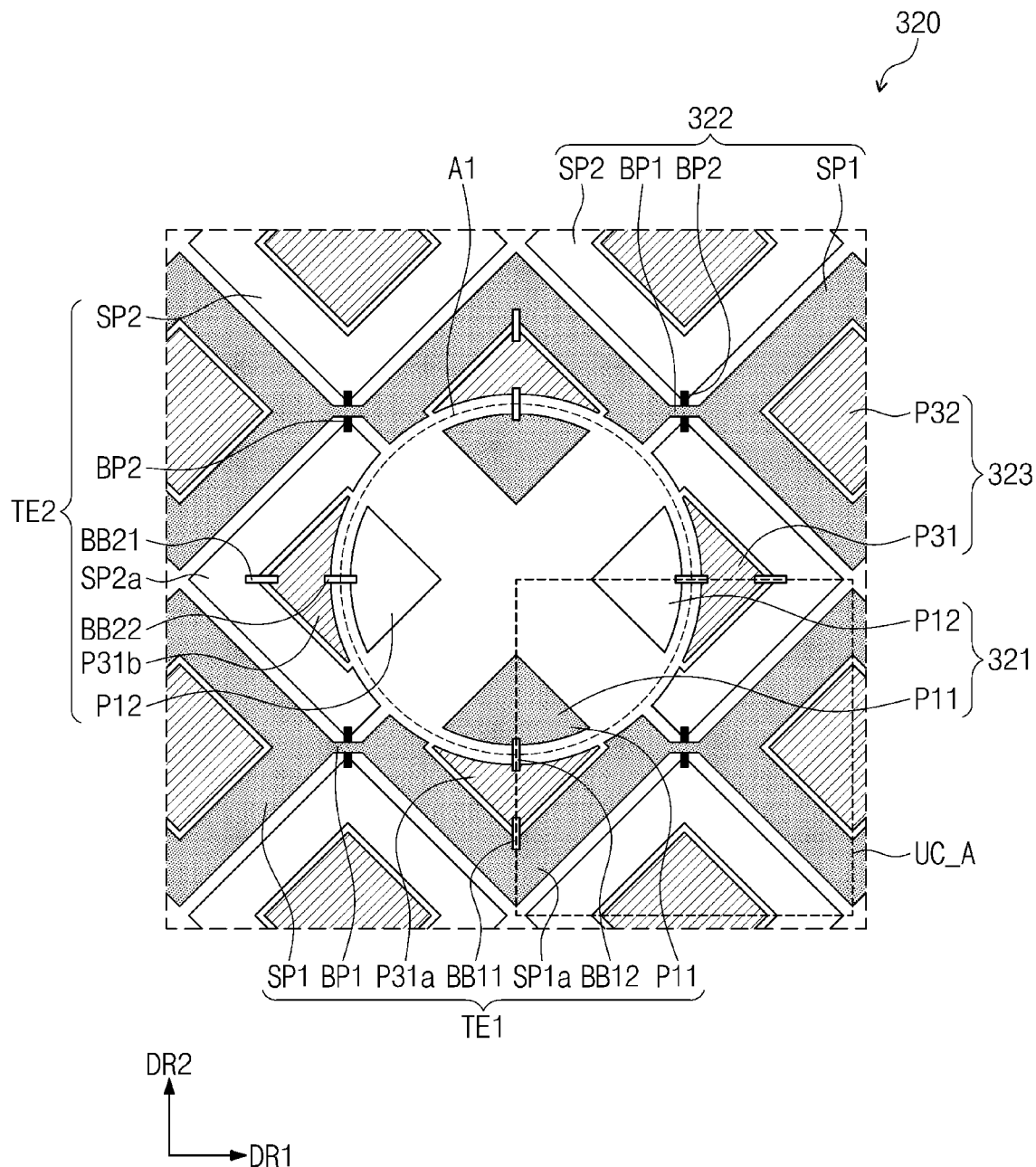
FIGS. 4A and 4B are plan views, each of which illustrates a portion of an input sensor according to an embodiment of the inventive concept.

The conductive patterns P1 and P2 may include a first conductive pattern 321 and a second conductive pattern 322 (see FIG. 4A). The first conductive pattern 321 may be disposed in the first region A1, and the second conductive pattern 322 may be disposed in the second region A2. The first conductive pattern 321 may be electrically connected to the second conductive pattern 322. This will be described in more detail below.

In an embodiment, since the first region A1 having the first emission part EP1 and the transmission part TP is formed in the active region AA (see FIG. 2A), the first region A1 in which the image IM (see FIG. 1) is displayed may have a high transmittance.

Figure 4B:
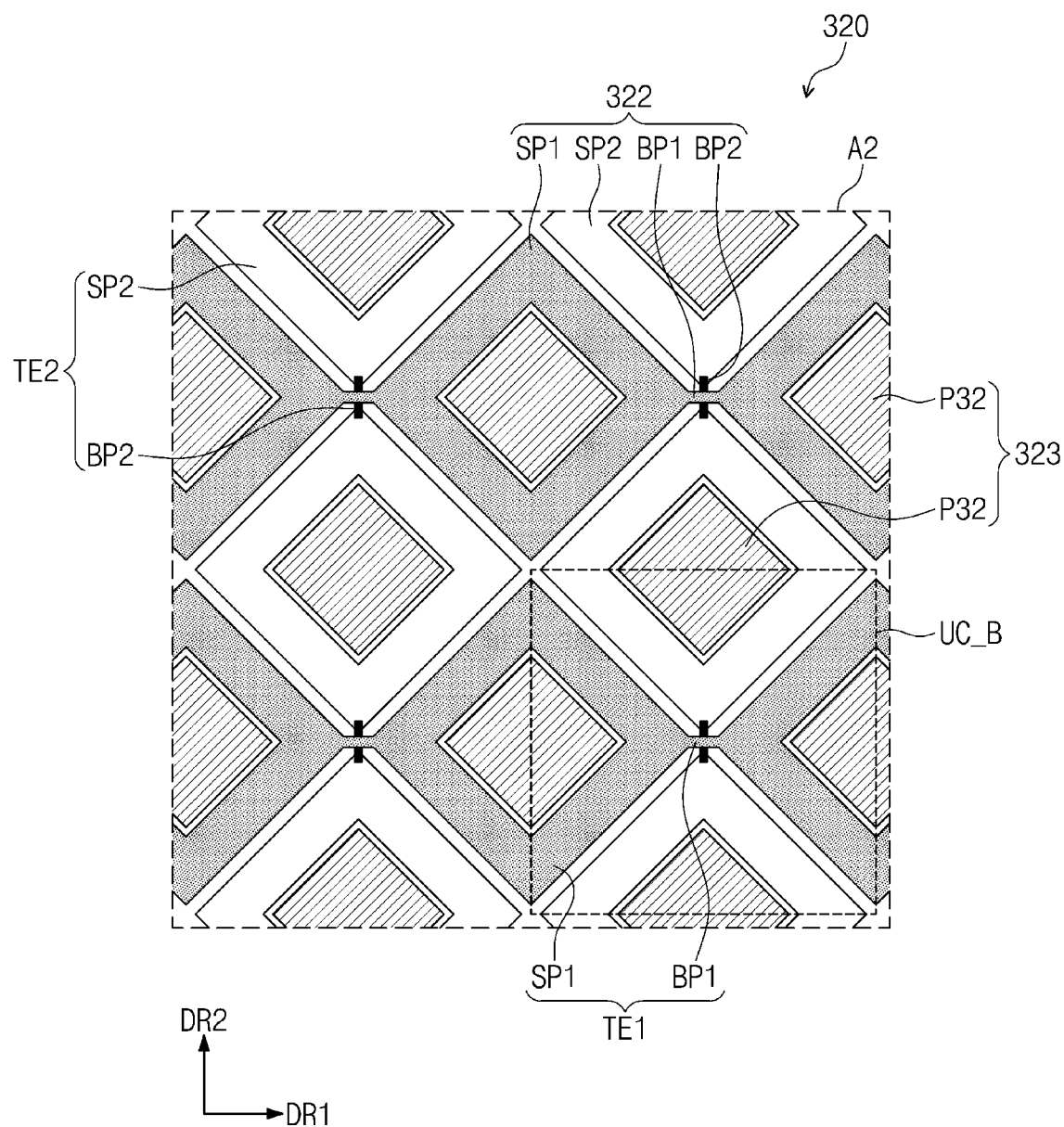

FIGS. 4A and 4B are plan views, each of which illustrates a portion of an input sensor according to an embodiment of the inventive concept. FIG. 4A illustrates a region including the first region A1, and FIG. 4B illustrates another region including a portion of the second region A2. Hereinafter, an embodiment of the inventive concept will be described with reference to FIGS. 4A and 4B.

As shown in FIGS. 4A and 4B, the input sensor 320 may include a first sensing electrode TE1 and a second sensing electrode TE2. The first sensing electrode TE1 may be disposed to cross the second sensing electrode TE2, when viewed in a plan view, and may be electrically disconnected from the second sensing electrode TE2. In the present embodiment, as shown in FIGS. 4A and 4B, the first sensing electrode TE1 may be extended in the first direction DR1 and the second sensing electrode TE2 may be extended in the second direction DR2. The input sensor 320 according to the present embodiment may sense an external input, based on a change in capacitance between the first and second sensing electrodes TE1 and TE2.

Each of the first and second sensing electrodes TE1 and TE2 may include the first conductive pattern 321, the second conductive pattern 322, and a third conductive pattern 323. Each of the first, second, and third conductive patterns 321, 322, and 323 may have a conductive property. Each of the first, second, and third conductive patterns 321, 322, and 323 may have a mesh shape with a plurality of openings. Alternatively, the first, second, and third conductive patterns 321, 322, and 323 may be formed of or include a transparent conductive oxide material.

The first conductive pattern 321 may be disposed in the first region A1. In the present embodiment, a plurality of first conductive patterns 321 may be spaced apart from each other when viewed in a plan view. The first conductive patterns 321 may be electrically connected to the second conductive pattern 322. The first conductive patterns 321 may, for example, include first patterns P11 constituting the first sensing electrode TE1 and second patterns P12 constituting the second sensing electrode TE2. In the first region A1, there may be two first patterns P11 facing each other in the second direction DR2 and two second patterns P12 facing each other in the first direction DR1.

The second conductive pattern 322 may be disposed in the second region A2. In an embodiment, a plurality of second conductive patterns 322 may be provided, and each of the second conductive patterns 322 may constitute the first sensing electrode TE1 or the second sensing electrode TE2. For example, the second conductive patterns 322 may include a plurality of first sensing parts SP1 and a plurality of first connecting portions BP1, which are electrically connected to each other to constitute the first sensing electrode TE1. A first connecting portion BP1 may be provided as a bridge between two adjacent first sensing parts SP1 along the first direction DR1. In addition, the second conductive patterns 322 may include a plurality of second sensing parts SP2 and a plurality of second connecting portions BP2, which are electrically connected to each other to constitute the second sensing electrode TE2. A second connecting portion BP2 may be provided as a bridge between two adjacent second sensing parts SP2 along the second direction DR2. The second connecting portion BP2 may overlap with and cross a first connecting portion BP1. In the present embodiment, the second conductive pattern 322 may further include first and second sensing parts SP1$a$ and SP2$a$, which are adjacent to the first region A1. In this case, the first and second sensing parts SP1$a$ and SP2$a$ may have a relatively small area, compared with the sensing parts SP1 and SP2 of the second conductive pattern 322, which are relatively far from the first region A1. For example, the first and second sensing parts SP1$a$ and SP2$a$ may be slightly greater than half the size of the sensing parts SP1 and SP2 of the second conductive pattern 322, which are relatively far from the first region A1.

In the present embodiment, the first sensing parts SP1 and the second sensing parts SP2 may be spaced apart from each other and may not be overlapped with each other, when viewed in a plan view. The first sensing parts SP1 and the second sensing parts SP2 may be disposed on the same layer. However, this is just an example, and if the first sensing parts SP1 and the second sensing parts SP2 can be electrically disconnected from each other, they may be disposed on different layers or may be overlapped with each other in the plan view. However, the inventive concept is not limited to this example or a specific embodiment.

The first connecting portions BP1 and the second connecting portions BP2 may be disposed on different layers from each other and may be electrically disconnected from each other. As shown in the present embodiment, the first connecting portions BP1 may be provided to cross the second connecting portions BP2 when viewed in a plan view. In addition, as shown in FIGS. 4A and 4B, the first connecting portions BP1 and the first sensing parts SP1 may be provided as a single object, and the second connecting portions BP2 and the second sensing parts SP2 may be provided on different layers. However, this is just an example, and the inventive concept is not limited to this example or a specific embodiment. For example, the first connecting portions BP1 may not be overlapped with the second connecting portions BP2, when viewed in a plan view, and the second connecting portions BP2 and the second sensing parts SP2 may be provided as a single object. Alternatively, each of the first and second connecting portions BP1 and BP2 may be provided to form a single object in conjunction with a corresponding sensing part.

The third conductive pattern 323 may be disposed in the second region A2. A plurality of third conductive patterns 323 may be provided to be spaced apart from each other when viewed in a plan view. Each of the third conductive patterns 323 may be surrounded by the first sensing parts SP1 or the second sensing parts SP2. For example, a first portion of the third conductive pattern 323 may be surrounded by the first sensing part SP1 and a second portion of the third conductive pattern 323 may be surrounded by the second sensing part SP2. In detail, each of the first and second sensing parts SP1 and SP2 may have a hole in its center region, and the third conductive patterns 323 may be disposed in the holes, respectively.

The third conductive patterns 323 may include a plurality of first patterns P31 and a plurality of second patterns P32. The first and second patterns P31 and P32 may be provided in the holes in the center regions of the first and second sensing parts SP1 and SP2. Each of the first patterns P31 may be spaced apart from the second conductive patterns 322, when viewed in a plan view. The first patterns P31 may be patterns of the third conductive patterns 323 which are adjacent to the first region A1.

Each of the first patterns P31 may be electrically connected to a corresponding adjacent one of the first conductive patterns 321. For example, ones of the plurality of first patterns P31, which are spaced apart from each other in the second direction DR2, may be connected to first patterns P11 of the first conductive patterns 321, and ones of the plurality of first patterns P31, which are spaced apart from each other in the first direction DR1, may be connected to second patterns P12. The first patterns P31 may be patterns of the third conductive patterns 323, which are adjacent to the first region A1 and are electrically connected to the first conductive pattern 321. Bridges may be provided to form the connections between the first conductive patterns 321 and the first patterns P31.

The second patterns P32 may be spaced apart from the second conductive patterns 322, respectively, when viewed in a plan view. The second patterns P32 may be patterns of the third conductive patterns 323, which are relatively far from the first region A1, compared with the first patterns P31. Each of the second patterns P32 may be electrically disconnected from the first and second sensing parts SP1 and SP2.

As described above, the input sensor 320 may sense an external input, based on a difference in capacitance between the first and second sensing electrodes TE1 and TE2. The first sensing electrode TE1 may include the first sensing parts SP1 and the first connecting portions BP1, and the second sensing electrode TE2 may include the second sensing parts SP2 and the second connecting portions BP2.

If the first and second sensing electrodes TE1 and TE2 pass through the first region A1, each of the first and second sensing electrodes TE1 and TE2 may include the first conductive patterns 321 and the third conductive patterns 323. Thus, the first sensing electrode TE1 may include the first sensing parts SP1, the first connecting portions BP1, the first patterns P11 of the first conductive patterns 321, and the first patterns P31 of the third conductive patterns 323 (e.g., ones P31a of first patterns P31 adjacent to the first sensing parts SP1). Similarly, the second sensing electrode TE2 may include the second sensing parts SP2, the second connecting portions BP2, the second patterns P12 of the first conductive patterns 321, and the first patterns P31 of the third conductive patterns 323 (e.g., ones P31b of the first patterns P31 adjacent to the second sensing parts SP2).

In the present embodiment, the first region A1 may be a region which is provided to have relatively high transmittance, compared with the second region A2. To increase the transmittance of the first region A1, the first conductive patterns 321 disposed in the first region A1 may have a smaller area than the second conductive patterns 322 (e.g., the first sensing part SP1 or the second sensing part SP2 that is farther from the first region A1). Here, the term 'area' is an actual area of an element having a conductive property, and in the case where the conductive patterns have a mesh shape, the term 'area' may mean the area of the mesh lines excluding an opening.

Comparing a unit region UC_A (hereinafter, a target unit region UC_A) including a portion of the first region A1 with a unit region UC_B (hereinafter, a normal unit region UC_B) in the second region A2, an area of the first sensing parts SP1 and SP1a, the second sensing parts SP2 and SP2a, or the first conductive patterns 321, which are provided in the target unit region UC_A, may be smaller than an area of the first sensing parts SP1 or the second sensing parts SP2, which are provided in the normal unit region UC_B. Accordingly, the first region A1 of the input sensor 320 may have sensitivity that is lower than the sensitivity in the second region A2. In other words, the first region A1 may have low sensitivity.

In an embodiment, a portion of the third conductive patterns 323, which are provided in the second region A2, may be used as the first sensing electrode TE1 or the second sensing electrode TE2, and in this case, it is possible to prevent the first region A1 from having low sensitivity. The first patterns P11 of the first conductive patterns 321 may be electrically connected to the first sensing part SP1a and one first pattern P31a of the first patterns P31 through connecting portions BB11 and BB12 to constitute the first sensing electrode TE1.

The second patterns P12 of the first conductive patterns 321 may be electrically connected to the second sensing part SP2a and one first pattern P31b of the first patterns P31 through connecting portions BB21 and BB22 to constitute the second sensing electrode TE2.

Values of a capacitance (Cm) and a capacitance variation (dCm) in each of an embodiment in the normal unit region UC_B (hereinafter, a first embodiment), an embodiment in the target unit region UC_A (hereinafter, a second embodiment), and embodiment in the target unit region UC_A (hereinafter, a comparative example) are summarized in the following table. In the first and second embodiments, a portion of the third conductive patterns 323 may be connected to the first or second conductive patterns 321 or 322 and may have a structure constituting the first or second sensing electrode TE1 or TE2. In the comparative example, the third conductive patterns 323 may be spaced apart from the first or second conductive patterns 321 or 322 and may have an electrically insulated structure.

TABLE 1

|  | Cm (fF) | dCm (fF) |
| --- | --- | --- |
| First embodiment | 490 | 74 |
| Comparative example | 259 | 34 |
| Second embodiment | 290 | 39 |

As shown in Table 1, the capacitance (Cm) or the capacitance variation (dCm) are higher in the second embodiment than in the comparative example. Accordingly, differences between the first embodiment and the second embodiment were smaller than differences between the first embodiment and the comparative example. Thus, by providing a portion of the third conductive patterns 323 as a portion of an electrode for sensing an external input, it is possible to improve sensitivity in the first region A1. According to an embodiment of the inventive concept, the first patterns P31a and P31b of the third conductive patterns disposed adjacent to the target unit region UC_A may be designed as an element constituting the first sensing electrode TE1 or the second sensing electrode TE2, and in this case, it is possible to provide substantially the same area as the first sensing parts SP1 or the second sensing parts SP2, which is provided in the normal unit region UC_B, for the target unit region UC_A including the portion of first region A1. Accordingly, it is possible to prevent the sensitivity property from being deteriorated in the first region A1 and to provide an input sensor having a uniform sensitivity property throughout the active region AA.

In reference to FIGS. 1-4B, an electronic apparatus 1000 according to an embodiment of the inventive concept includes: an electronic module 400; a display panel 310 divided into or including a first region A1 overlapped with the electronic module 400 and a second region A2 adjacent to the first region A1, when viewed in a plan view, the display panel 310 including a plurality of first emission parts EP1, which are disposed in the first region A1 and are spaced apart from each other, and a plurality of second emission parts EP2, which are disposed in the second region A2 and are spaced apart from each other, and an input sensor 320 including a first electrode (e.g., the second sensing electrode TE2), which is disposed on the first region A1, a second electrode (e.g., the second sensing electrode TE2), which is disposed on the second region A2, a third electrode (e.g., the first sensing electrode TE1), which is disposed on the second region A2 and is electrically disconnected from the second electrode (e.g., the second sensing electrode TE2), and a plurality of conductive patterns 321 to 323, which are disposed on the first region A1 and are spaced apart from each other, wherein the conductive patterns (e.g., the third conductive pattern 323) include a first pattern P31, which is electrically connected to the first electrode (eg., the second sensing electrode TE2) in the first region A1, and a second pattern P32, which is in an electrically floated state.

FIGS. 5A to 5D are plan views, each of which illustrates a portion of an input sensor according to an embodiment of the inventive concept. In detail, each of FIGS. 5A to 5D illustrates a region corresponding to FIG. 4A. Hereinafter, an embodiment of the inventive concept will be described with reference to FIGS. 5A to 5D. It is to be understood that the notation for the elements shown in FIGS. 5A to 5D is similar to that in FIG. 4A, except that FIG. 5A includes a "-1" indicator, FIG. 5B includes a "-2" indicator, FIG. 5C includes a "-3" indicator and FIG. 5D includes a "-4" indicator.

Figure 5A:
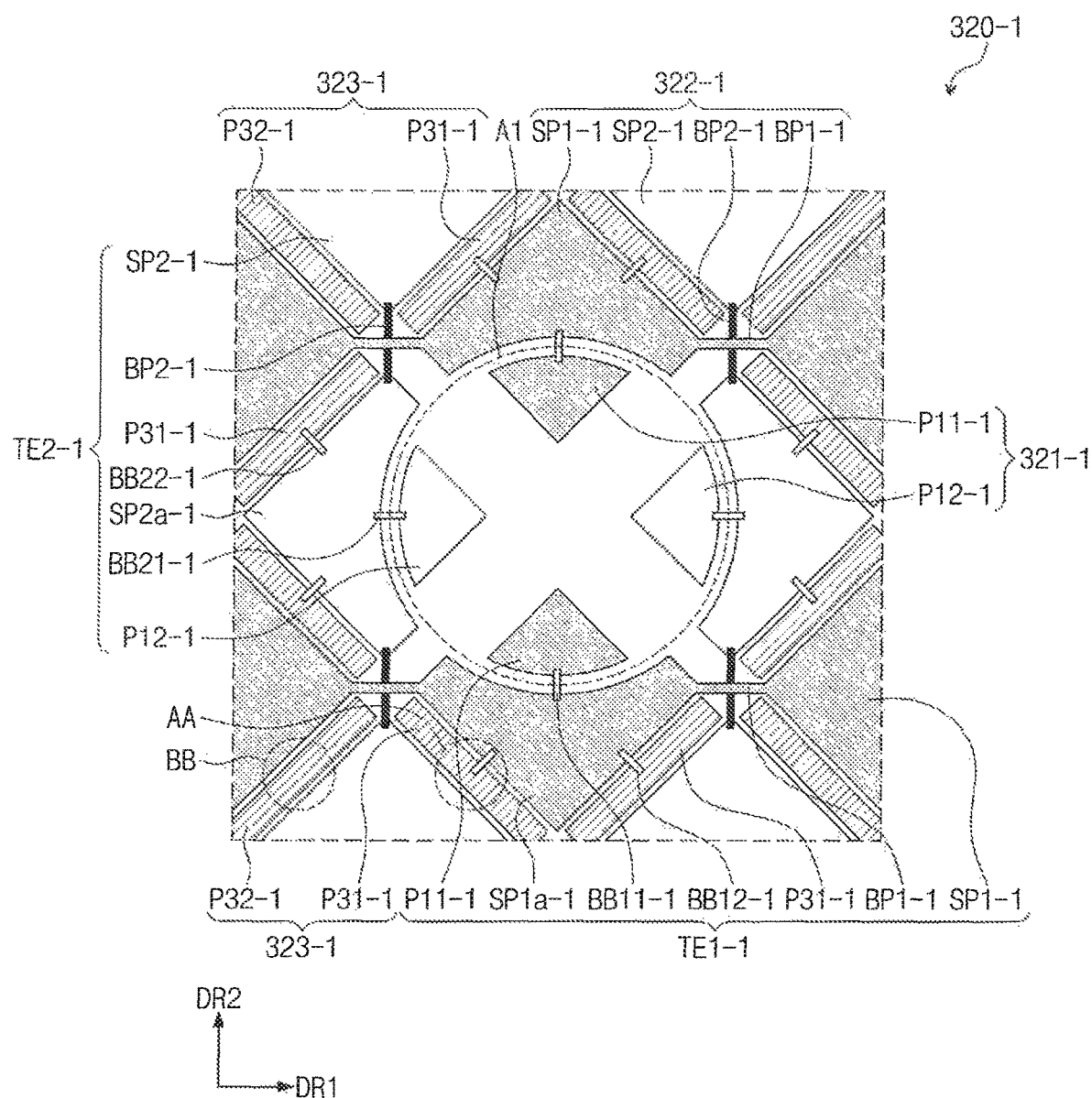
FIGS. 5A, 5B, 5C and 5D are plan views, each of which illustrates a portion of an input sensor according to an embodiment of the inventive concept.

As shown in FIG. 5A, in an input sensor 320-1, the first conductive patterns 321-1 may include first patterns P11-1 and second patterns P12-1, and third conductive patterns 323-1 may be disposed between first sensing parts SP1-1 and second sensing parts SP2-1 of second conductive patterns 322-1. Each of the third conductive patterns 323-1 may be disposed in a region, which is surrounded by the first sensing parts SP1-1, the second sensing parts SP2-1, first connecting portions BP1-1, and second connecting portions BP2-1.

A first conductive pattern 321-1 may be corresponding to the first conductive pattern 321 shown in FIG. 4A. Accordingly, first and second sub conductive pattern P11-1 and P12-1 may be respectively corresponding to the first and second sub conductive patterns P11 and P12 shown in FIG. 4A.

The first sensing part SP1a-1 may be connected to the first sub conductive pattern P11-1 through a connection pattern BB11-1. The third conductive patterns 323-1 may include a plurality of first patterns P31-1 and a plurality of second patterns P32-1. As shown in AA the first patterns P31-1 may be connected to adjacent sensing part, and as shown in BB the second patterns P32-1 may be in an electrically floated state from adjacent sensing part. The first patterns P31-1 may be disposed adjacent to the first region A1 and may constitute the first sensing electrode TE1 or the second sensing electrode TE2. For example, a portion of the first patterns P31-1 may be electrically connected to a first sensing part SP1a-1 through a connection pattern BB12-1 to constitute a first sensing electrode TE1-1.

The Second sensing part SP2a-1 may be connected to the second sub conductive pattern P12-1 through a connection pattern BB21-1. Another portion of the first patterns P31-1 may be electrically connected to a second sensing part SP2a-1 through a connection pattern BB22-1 to constitute a second sensing electrode TE2-1.

According to an embodiment of the inventive concept, since at least some patterns of the third conductive patterns 323-1 adjacent to the first region A1 are used as parts of the first and second sensing electrodes TE1-1 and TE2-1, it is possible to compensate for a reduction of the sensitivity in the first region A1. Accordingly, it is possible to realize uniform sensitivity for a touch event that occurs on the first region A1 and the second region A2.

Figure 5B:
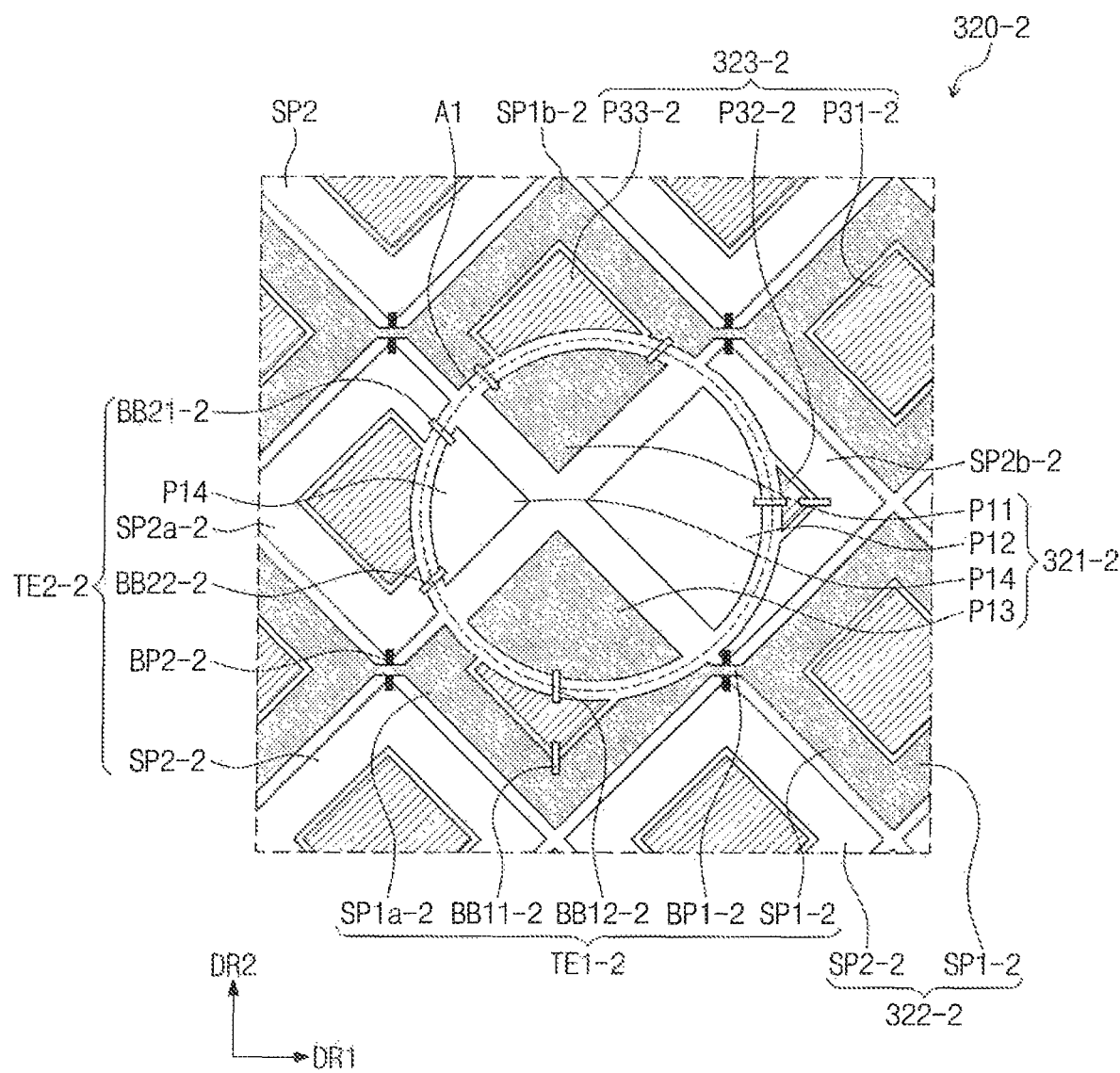

In an input sensor 320-2 shown in FIG. 5B, first conductive patterns 321-2 may be provided in different sizes. Depending on a position at which the first region A1 is formed, the sensing parts SP1a-2 and SP2a-2 adjacent to the first region A1 may be designed in various areas. Accordingly, the first conductive patterns 321-2 may also be designed in various areas.

In detail, the input sensor 320-2 may include a first sensing electrode TE1-2, which includes a first sensing part SP1-2 and a first connecting portion BP1-2, and a second sensing electrode TE2-2, which includes a second sensing part SP2-2 and a second connecting portion BP2-2. The first conductive pattern 321-2 may include first, second, third and fourth patterns P11, P12, P13, and P14, which have different shapes from each other.

The first and third patterns P11 and P13 are included in two of the first sensing electrodes TE1-2. The first and third patterns P11 and P13 may be electrically connected to the first sensing parts SP1a-2 and SP1b-2, each being part of the first sensing electrodes TE1-2. The first pattern P11 may be electrically connected to the first sensing parts SP1b-2 and isolated from third pattern P33. The third pattern P13 may be electrically connected to the first sensing parts SP1a-2 through two connection patterns BB11-2 and BB12-2 and the third pattern P33.

Two of the second sensing electrode TE2-2 may include the second and fourth patterns P12 and P14, which are included in the first conductive patterns 321-2, and are adjacent to each other. The second and fourth patterns P12 and P14 may be respectively electrically connected to the second sensing parts SP2a-2 and SP2b-2, which are adjacent to the first region A1. The Second pattern P12 may be electrically connected to the second sensing parts SP2b-2 through the second pattern P32. The fourth pattern P14 may be electrically connected to the second sensing parts SP2a-2 through two connection patterns BB21-2 and BB22-2.

In the case where the sensing parts SP1a-2 and SP2b-2 adjacent to the first region A1 have a small area, one pattern of the first conductive patterns 321-2, which is connected to a corresponding sensing part, may have a large area. For example, the second and third patterns P12 and P13 of the first conductive patterns 321-2, which are respectively adjacent to the sensing parts SP2*b*-2 and SP1*a*-2 having a relatively small area of the sensing parts surrounding the first region A1, may have relatively large areas, whereas the first and fourth patterns P11 and P14, which are respectively adjacent to the sensing parts SP1*b*-2 and SP1*a*-2 having a relatively large area of the sensing parts surrounding the first region A1, may have relatively small areas.

A third conductive pattern 323-2 may include fifth, sixth and seventh patterns P31-2, P32-2, and P33-2. The fifth patterns P31-2 may be floating patterns, which are electrically disconnected from the first conductive pattern 321-2 or a second conductive pattern 322-2. The sixth patterns P32-2 may be patterns, which are disposed adjacent to the first region A1 and constitute the first sensing electrode TE1-2 or the second sensing electrode TE2-2. The seventh patterns P33-2 may be floating patterns, which are disposed adjacent to the first region A1 and are electrically disconnected from the first conductive pattern 321-2 or the second conductive pattern 322-2.

According to the present embodiment, a portion of the third conductive patterns 323-2 (e.g., the sixth and seventh patterns P32-2 and P33-2 adjacent to the first region A1) may constitute the first and second sensing electrodes TE1-2 and TE2-2, and another portion may be in an electrically floated state. In detail, the seventh pattern P33-2, which is one of the patterns P32-2 and P33-2 and is adjacent to the sensing parts SP1*a*-2 and SP1*b*-2 having a relatively large area, may be electrically disconnected from the first conductive patterns 321-2 and the second conductive patterns 322-2, whereas the sixth patterns P32, which are adjacent to the sensing parts SP1*a*-2 and SP1*b*-2 having a relatively small area, may be electrically connected to the sensing parts SP1*a*-2 and SP1*b*-2 corresponding thereto to constitute the first and second sensing electrodes TE1-2 and TE2-2.

According to an embodiment of the inventive concept, even though the first region A1 is located at a position where an area of the sensing parts is nonuniform, the third conductive patterns 323-2 may be designed to have two different portions, which are respectively used as a sensing electrode and a floating electrode, and in this case, it is possible to reduce a variation of the sensitivity in the first region A1.

Figure 5C:
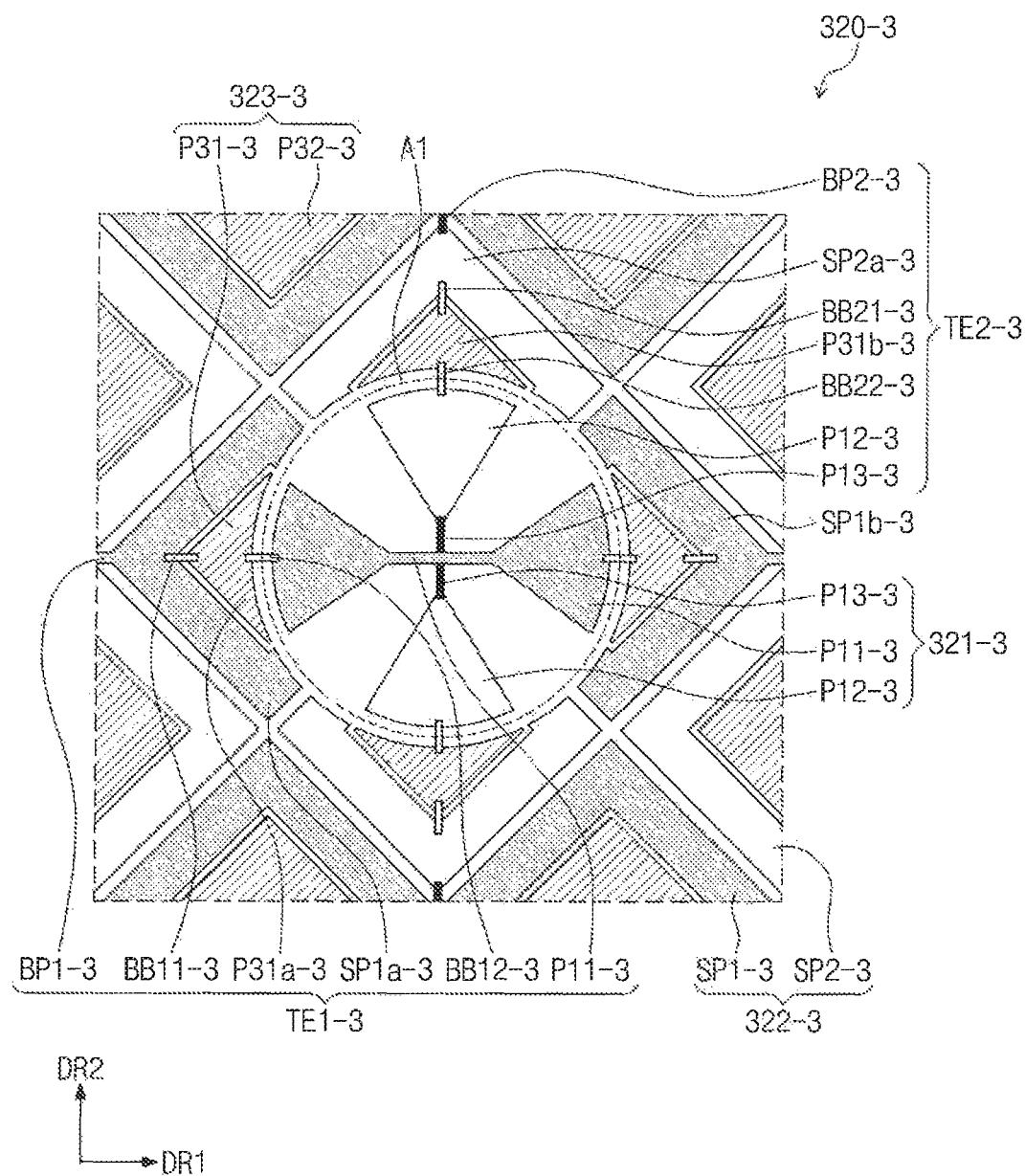

In an input sensor 320-3 shown in FIG. 5C, the first region A1 may be formed at an intersection of a first connecting portion BP1-3 and a second connecting portion BP2-3, which are electrically disconnected from each other. Here, a first conductive pattern 321-3 may include a plurality of conductive patterns, which are disposed on different layers.

In detail, a first conductive pattern 321-3 may include a first pattern P11-3, a second pattern P12-3, and a third pattern P13-3. A second conductive pattern 322-3 may include first sensing parts SP1-3 and second sensing parts SP2-3. The first pattern P11-3 may electrically connect two third patterns P31*a*-3 of third conductive patterns 323-3, which are adjacent to the first region A1 and are spaced apart from and opposite to each other in the first direction DR1. The third patterns P31*a*-3 may electrically connect the first pattern P11-3 to one of first sensing parts SP1*a*-3 of the first sensing parts SP1-3 through connecting portions BB11-3 and BB12-3. Two of the first sensing parts SP1*a*-3 and SP1*b*-3 spaced apart with the first region A1 in between may electrically connected to each other through the first pattern P11-3.

In an embodiment, a plurality of the second patterns P12-3 may be provided and may be connected to two third patterns P31*b*-3 of the third conductive patterns 323-3, which are adjacent to the first region A1 and are spaced apart from and opposite to each other in the second direction DR2.

The third conductive pattern is 323-3 may electrically connect the second patterns P12-3 to one of second sensing parts SP2*a*-3 of the second sensing parts SP2-3 through connecting portions BB21-3 and BB22-3. The third pattern P13-3 may be a pattern which is disposed on a different layer from the first or second patterns P11-3 or P12-3. The third pattern P13-3 may be disposed on a different layer from the first pattern P11-3 and may be electrically disconnected from the first pattern P11-3. Accordingly, even when the first region A1 is provided in an intersectional region between a first sensing electrode TE1-3 and a second sensing electrode TE2-3, an area of a sensor may be compensated through a third pattern P31*a*-3 adjacent to the first region A1, and thus, it may be possible to suppress a reduction of the sensitivity in the first region A1. Alternatively, in an input sensor 320-4 shown in FIG. 5D, each of first, second and third conductive patterns 321-4, 322-4, and 323-4 may include a plurality of mesh lines crossing each other. The input sensor 320-4 may include first and second sensing electrodes TE1-4 and TE2-4. The input sensor 320-4 may have substantially the same shape as the input sensor 320 of FIG. 4A but may be differ from the input sensor 320 of FIG. 4A in that it is composed of mesh lines. Due to the mesh lines, the sensitivity of the input sensor 320-4 may be decreased. Features associated with the mesh lines will be described with reference to FIG. 6, and thus, an overlapping description thereof will be omitted.

Figure 5D:
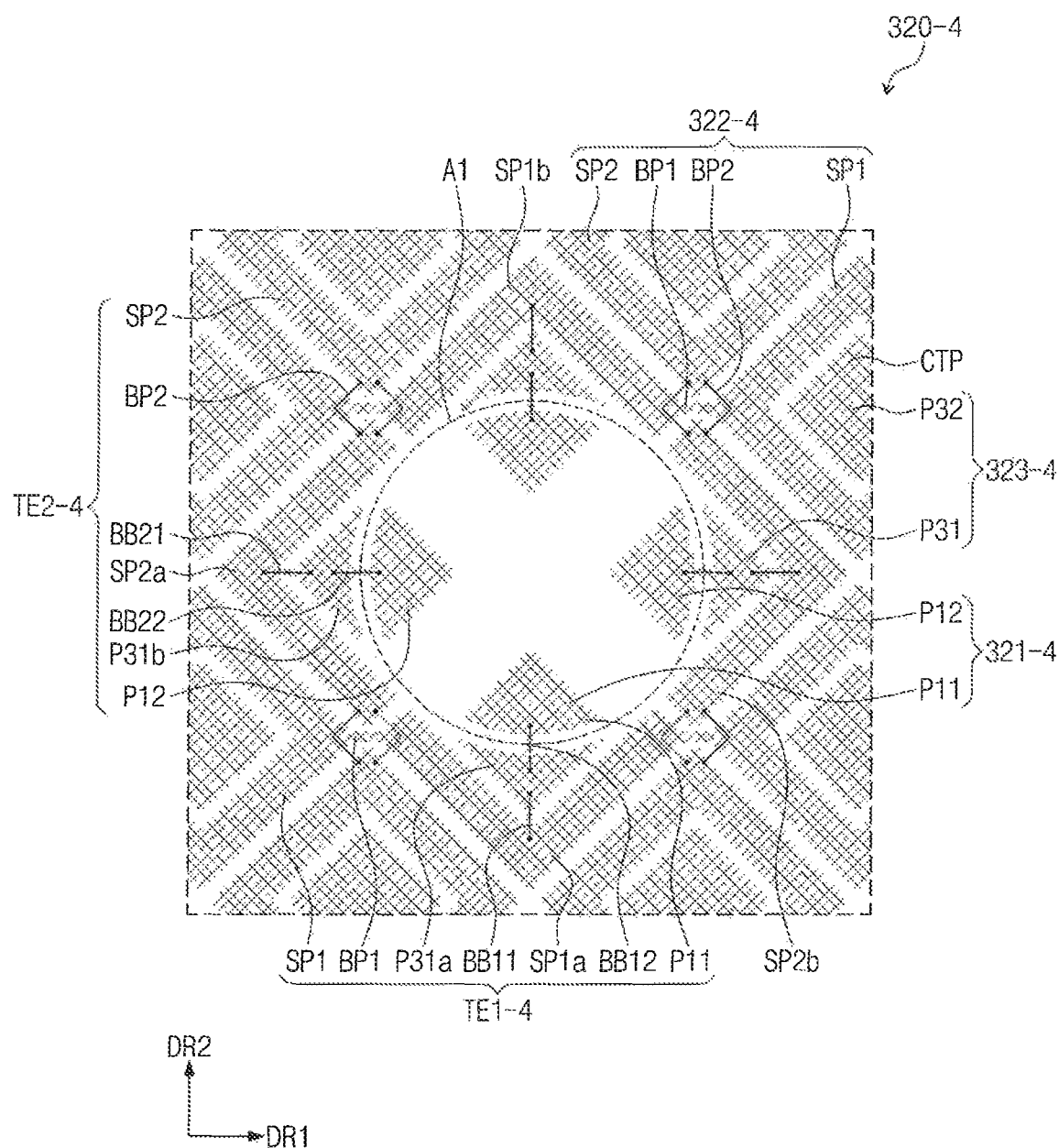

As shown in FIG. 5D, cut portions CTP may be provided in the input sensor 320-4. The cut portions CTP may be formed by partially cutting the mesh lines. For example, a single line of the mesh lines is cut, and the cut portion is removed to form a gap or opening in the single line. Since the cut portions CTP are provided in the input sensor 320-4, it is possible to prevent a boundary between the first and second sensing parts SP1 and SP2 from being easily recognized by a user.

The cut portions CTP may be formed in the second and third conductive patterns 322-4 and 323-4 of the input sensor 320-4. Here, the cut portions CTP may not be formed in a portion of the second conductive pattern 322-4 adjacent to the first region A1. In detail, the cut portions CTP may not be formed in the sensing parts SP1*a*, SP1*b*, SP2*a*, and SP2*b* of the second conductive pattern 322-4 and the first pattern P31 of the third conductive pattern 323-4, which are adjacent to the first region A1. By contrast, the cut portions CTP may be formed in the sensing parts SP1 and SP2 and the second pattern P32 of the third conductive pattern 323-4, which are relatively far apart from the first region A1. Accordingly, since the cut portions CTP are not formed in the sensing parts SP1*a*, SP1*b*, SP2*a*, and SP2*b*, and the first pattern P31, which are adjacent to the first region A1 and have a relatively small size, it is possible to prevent the sensing area from being excessively reduced in the first region A1. Thus, it is possible to realize uniform sensitivity throughout the first and second regions A1 and A2, to which an input from a user is applied.

Figure 6:
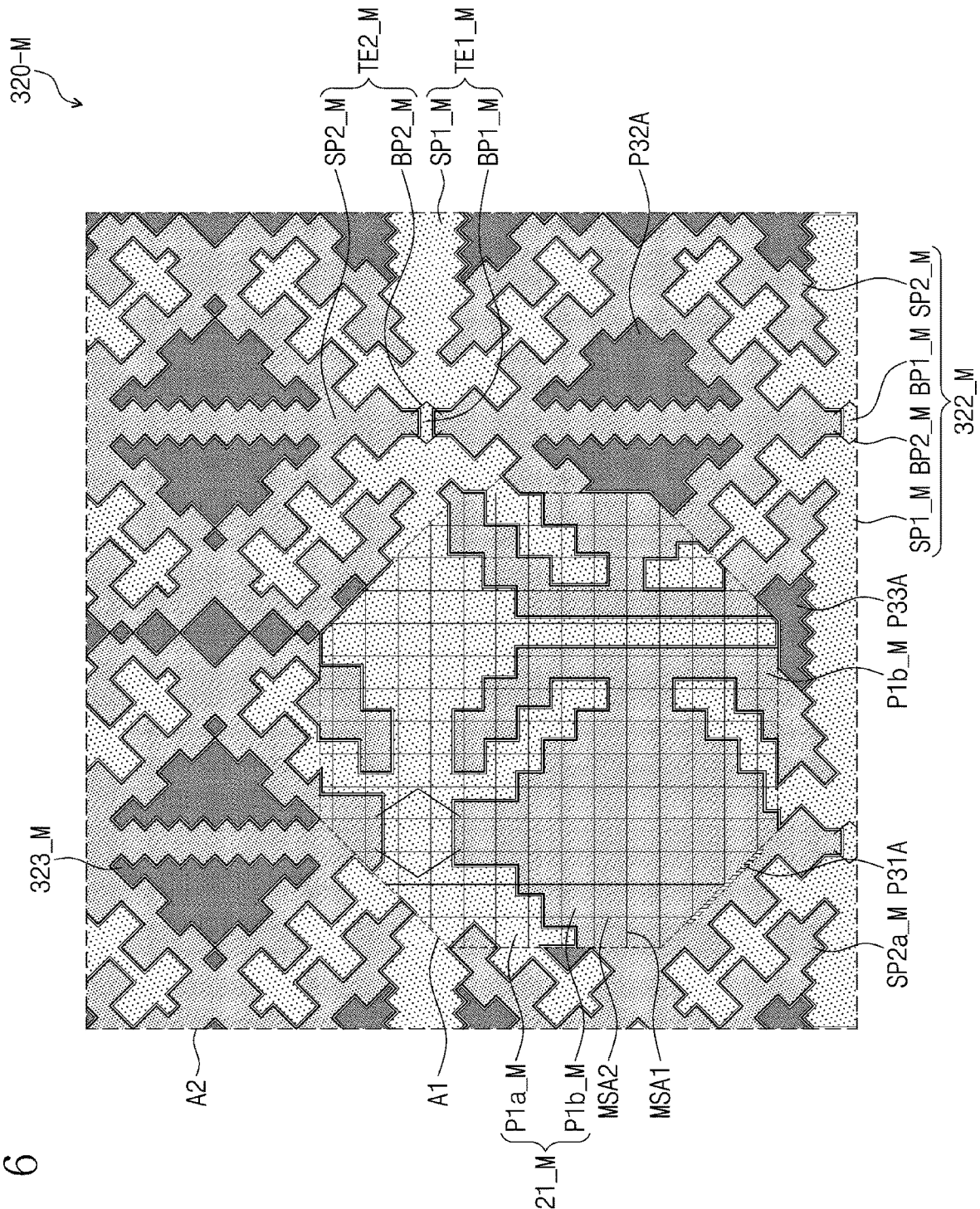
FIG. 6 is a plan view illustrating a portion of an input sensor according to an embodiment of the inventive concept.

FIG. 6 is a plan view illustrating a portion of an input sensor according to an embodiment of the inventive concept. For convenience in illustration, some elements may be omitted from FIG. 6. Hereinafter, an embodiment of the inventive concept will be described with reference to FIG. 6.

As shown in FIG. 6, an input sensor 320-M may include a first conductive pattern 321_M, a second conductive pattern 322_M, and a third conductive pattern 323_M. The second conductive pattern 322_M may include first sensing parts SP1_M, first connecting portions BP1_M, second sensing parts SP2_M, and second connecting portions BP2_M. The first sensing parts SP1_M and the first connecting portions BP1_M may constitute a first sensing electrode TE1_M, and the second sensing parts SP2_M and the second connecting portions BP2_M may constitute a second sensing electrode TE2_M.

In FIG. 6, the first sensing electrode TE1_M and the second sensing electrode TE2_M are illustrated with different hatchings, for convenience in illustration. The first to third conductive patterns 321_M, 322_M, and 323M may each include a plurality of mesh lines. In the present embodiment, the first conductive pattern 321_M may include a plurality of mesh lines whose density is lower than density of mesh lines included in the second or third conductive patterns 322_M or 323_M.

In other words, a size of the openings, which are formed by the mesh lines of the first conductive pattern 321_M may be larger than a size of the openings, which are formed by the mesh lines of the second conductive pattern 322_M or by the mesh lines of the third conductive pattern 323_M.

In another embodiment, the first conductive pattern 321_M may include a plurality of mesh lines whose density is greater than density of mesh lines included in the second or third conductive patterns 322_M or 323_M, or whose density is the same as density of mesh lines included in at least one of the second conductive pattern 322_M and the third conductive pattern 323_M.

Only mesh lines MSA1 and MSA2 of the first conductive pattern 321_M defining relatively large openings are illustrated in FIG. 6, for convenience in illustration. The mesh lines MSA1 and MSA2 may include the mesh lines MSA1 and MSA2 crossing each other. Thus, a sensing area of the first conductive pattern 321_M having a conductive property may be smaller than or equal to that of the second or third conductive pattern 322_M or 323_M, even when the first conductive pattern 321_M is illustrated to have a larger planar area than the second or third conductive pattern 322_M or 323_M.

In addition, the mesh lines MSA1 and MSA2 of the first conductive pattern 321_M and the mesh lines of the second conductive pattern 322_M may be extended in different directions. For example, the mesh lines MSA1 and MSA2 of the first conductive pattern 321_M are illustrated in vertical and horizontal directions, but the mesh lines of the second conductive pattern 322_M may be extended in a direction that is inclined at an angle to the mesh lines MSA1 and MSA2 of the first conductive pattern 321_M. For example, the mesh lines of the second conductive pattern 322_M may be extended in a diagonal direction.

In an embodiment, a first pattern P1$a$_M of the first conductive pattern 321_M, which is disposed in the first region A1, may be electrically connected to the first sensing part SP1_M to constitute the first sensing electrode TE1_M. For example, the first pattern P1$a$-M, which is disposed in the first region A1, may be electrically connected to a plurality of first sensing parts SP1_$m$ disposed outside the first region A1. A second pattern P1$b$_M of the first conductive pattern 321_M may be electrically connected to the second sensing part SP2_M to constitute the second sensing electrode TE2_M. Since the first and second patterns P1$a$_M and P1$b$_M include mesh lines whose density is lower than the second conductive pattern 322_M, the first region A1 may have relatively high transmittance, compared with the second region A2.

The third conductive pattern 323_M may include third, fourth and fifth patterns P31A, P32A, and P33A. The third pattern P31A may be a pattern that is electrically connected to the first conductive pattern 321_M. The fourth pattern P32A may be a pattern, which is provided adjacent to the first region A1 and is in a floated state. The fifth pattern P33A may be a pattern, which is disposed at a position far from the first region A1 and is in an electrically floated state. In an embodiment, a sensing part SP2$a$_M, which is adjacent to the first region A1 and has a small area, may be electrically connected to the third pattern P31A and the second pattern P1$b$_M to have an increased sensing area. Accordingly, it is possible to suppress a reduction of the touch sensitivity in the first region A1.

Figure 7A:
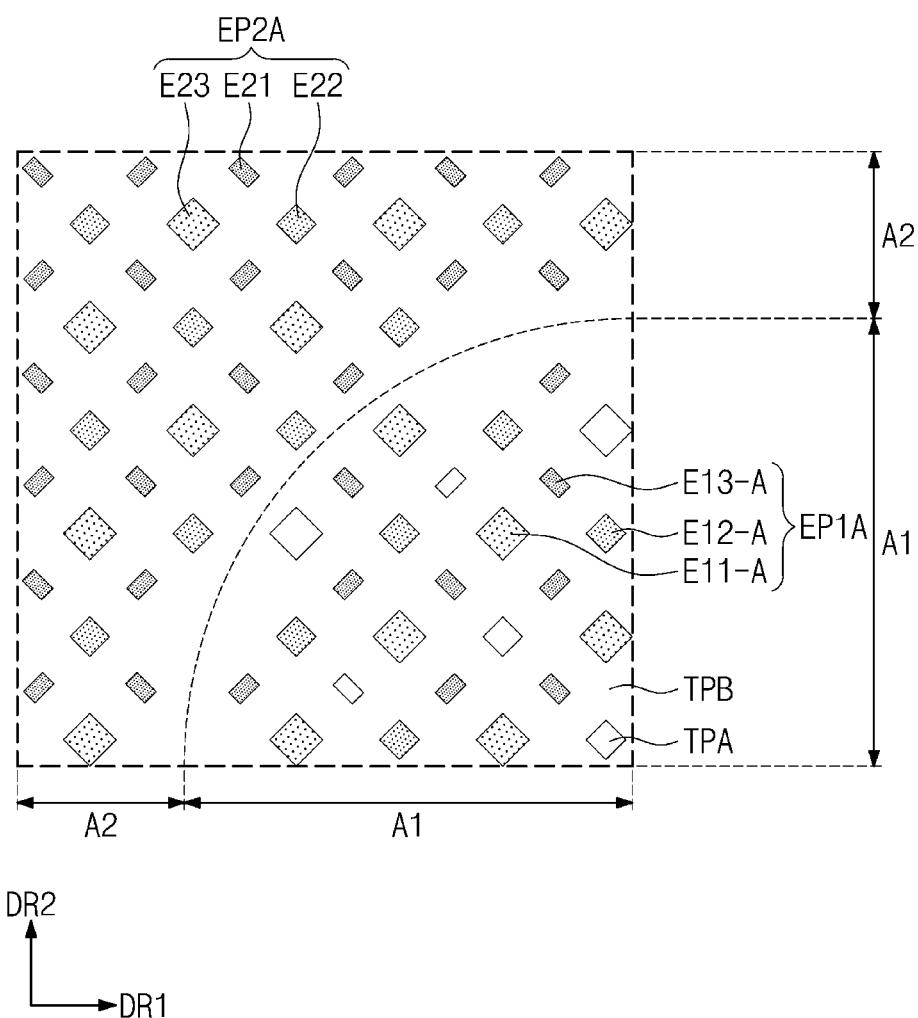
FIGS. 7A, 7B and 7C are plan views, each of which illustrates a display panel according to an embodiment of the inventive concept.
Figure 7B:
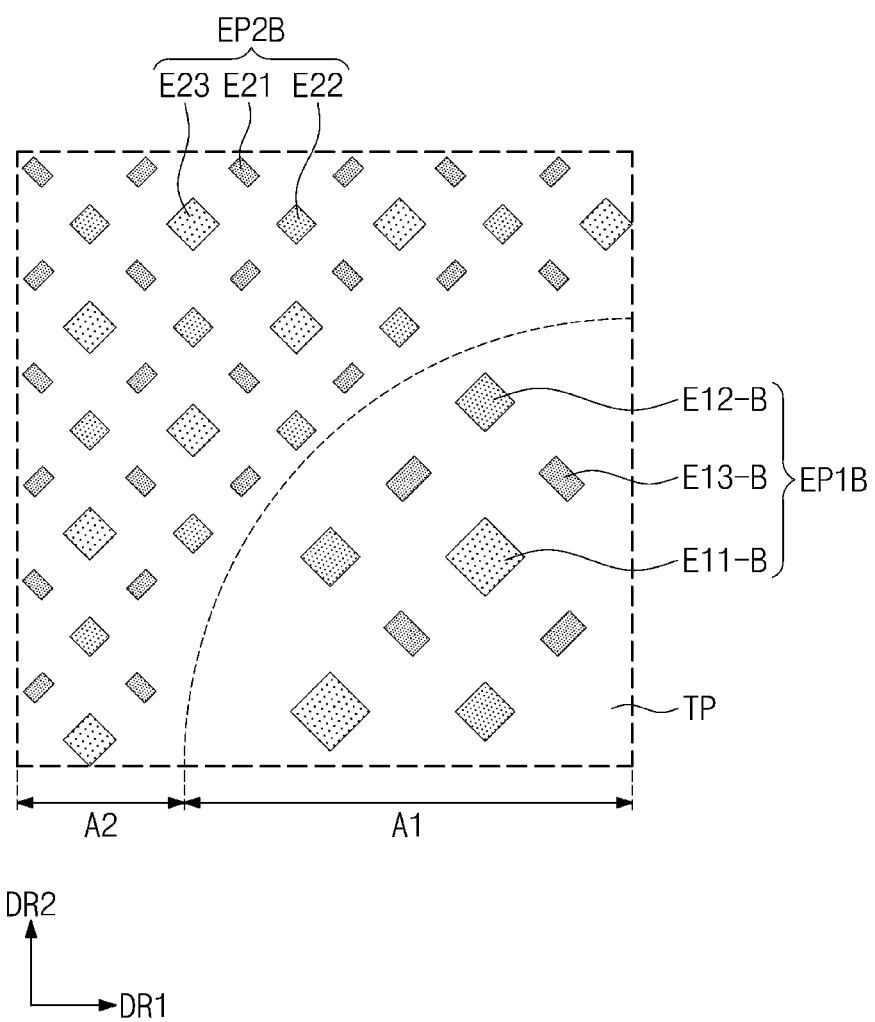
Figure 7C:
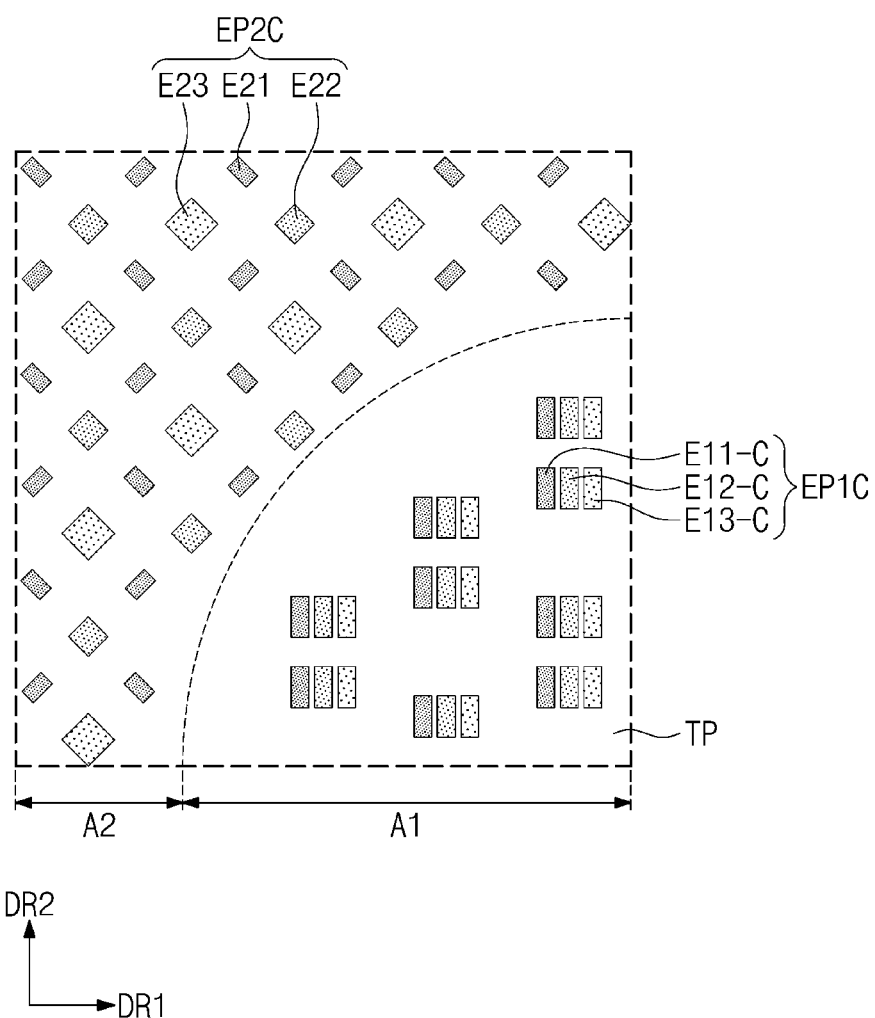

FIGS. 7A to 7C are plan views, each of which illustrates a display panel according to an embodiment of the inventive concept. Some examples of emission and transmission parts, which are arranged in the first and second regions A1 and A2, are illustrated FIGS. 7A to 7C. Hereinafter, an embodiment of the inventive concept will be described with reference to FIGS. 7A to 7C.

As shown in FIGS. 7A to 7C, an arrangement of emission parts in the first region A1 (hereinafter, first emission parts) may be different from an arrangement of emission parts in the second region A2 (hereinafter, second emission parts). This makes it possible to realize the first region A1, which has higher transmittance than the second region A2.

In detail, as shown in FIG. 7A, first emission parts EP1A and transmission parts TPA may be arranged in the first region A1, and only second emission parts EP2A may be arranged in the second region A2. The first emission parts EP1A may include three sub-light-emitting patterns E11-A, E12-A, and E13-A emitting light of different colors. The second emission parts EP2A may include three sub-light-emitting patterns E21, E22, and E23, which are configured to emit lights of different colors. The transmission part TPA may be disposed in the first region A1.

As shown in FIG. 7A, the first emission parts EP1A may have an arrangement, which is substantially similar to that of the second emission parts EP2A, and in which some of the sub-light-emitting patterns are substituted by the transmission parts TPA. Accordingly, the transmission parts TPA may have various sizes.

As shown in FIG. 7A, a transmission part TPB may be provided in a portion of the first region A1 excluding the first emission parts EP1A. In detail, the portion of the first region A1 excluding the first emission parts EP1A may be used as the transmission part TPB, and in this case, they, along with the patterned transmission parts TPA, may form a transmission region of the first region A1. The transmission parts TPA and TPB may have high transmittance, compared with a region excluding the first and second emission parts EP1A and EP2A or the second region A2. The transmission parts TPA and TPB may be provided in various shapes, but the inventive concept is not limited to this example or a specific embodiment.

As shown in FIG. 7B, first emission parts EP1B may have a relatively large planar area, compared with a second emission parts EP2B. In the present embodiment, the transmission part TP is illustrated as a portion of the first region A1 excluding the first emission parts EP1B. Three sub-light-emitting patterns E11-B, E12-B, and E13-B may have relatively large areas, compared with sub-light-emitting patterns E21, E22, and E23 of the second emission part EP2B emitting corresponding colors. In addition, the sub-light-emitting patterns E11-B, E12-B, and E13-B may be designed such that distances therebetween are larger than distances between the sub-light-emitting patterns E21, E22, and E23 of the second emission part EP2B.

In an embodiment shown in FIG. 7C, first emission parts EP1C may have an arrangement different from second emission parts EP2C. In the present embodiment, the transmission part TP is illustrated as a portion of the first region A1 excluding the first emission parts EP1C. The sub-light-emitting patterns E11-C, E12-C, and E13-C of the first emission parts EP1C may be arranged in a stripe shape that is parallel to each of the first and second directions DR1 and DR2, and the sub-light-emitting patterns E21, E22, and E23 of the second emission parts EP2C may be arranged in a direction that is inclined at an angle with respect to each of the first and second directions DR1 and DR2. Accordingly, it is possible to increase a distance between the first emission parts EP1C in the first region A1 and to increase an optical transmittance in the first region A1.

According to an embodiment of the inventive concept, since the emission parts in the first region A1 are arranged to have a lower density than the second region A2 and the transmission parts TPA, TPB, and TP are provided in the first region A1, the first region A1 may have high optical transmittance.

Figure 8:
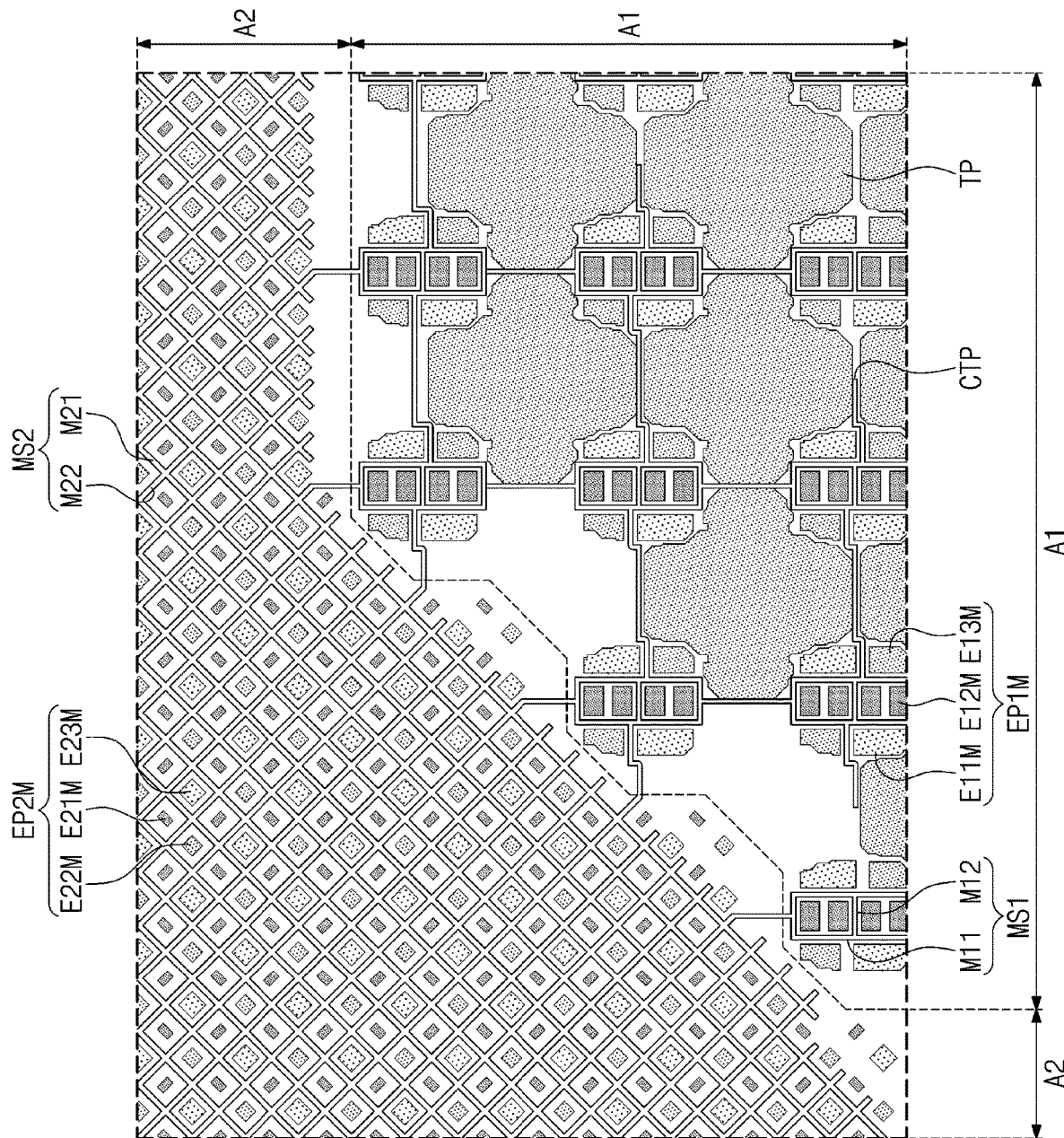
FIG. 8 is a plan view illustrating a region of an electronic panel according to an embodiment of the inventive concept.
Figure 9A:
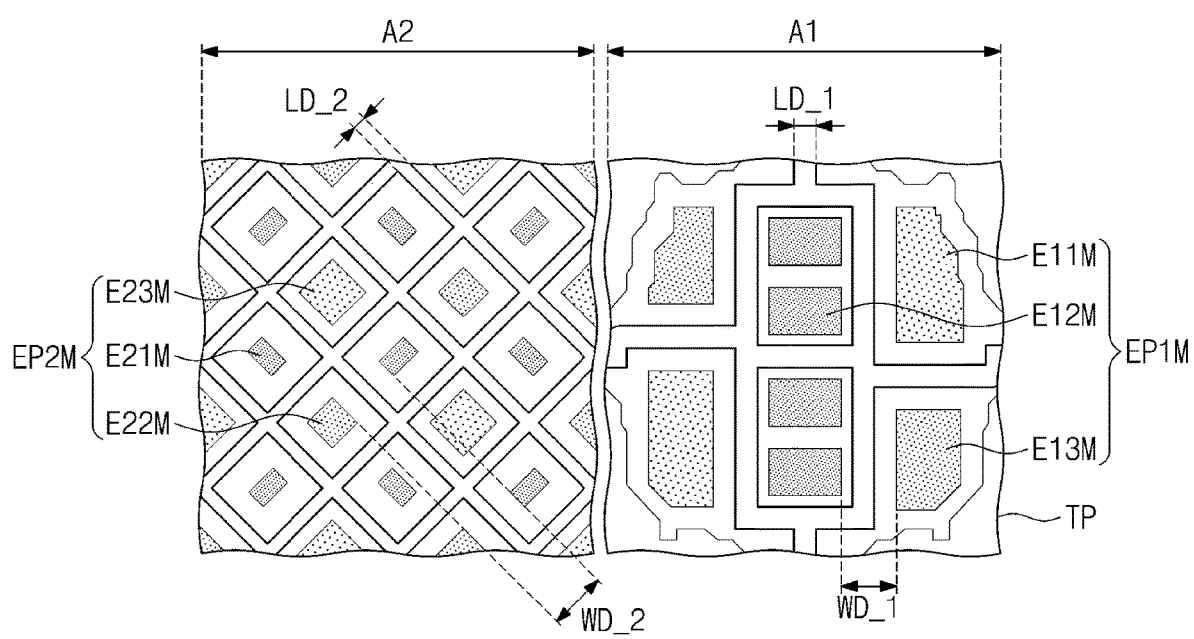
FIGS. 9A and 9B are enlarged plan views illustrating a region of FIG. 8.
Figure 9B:
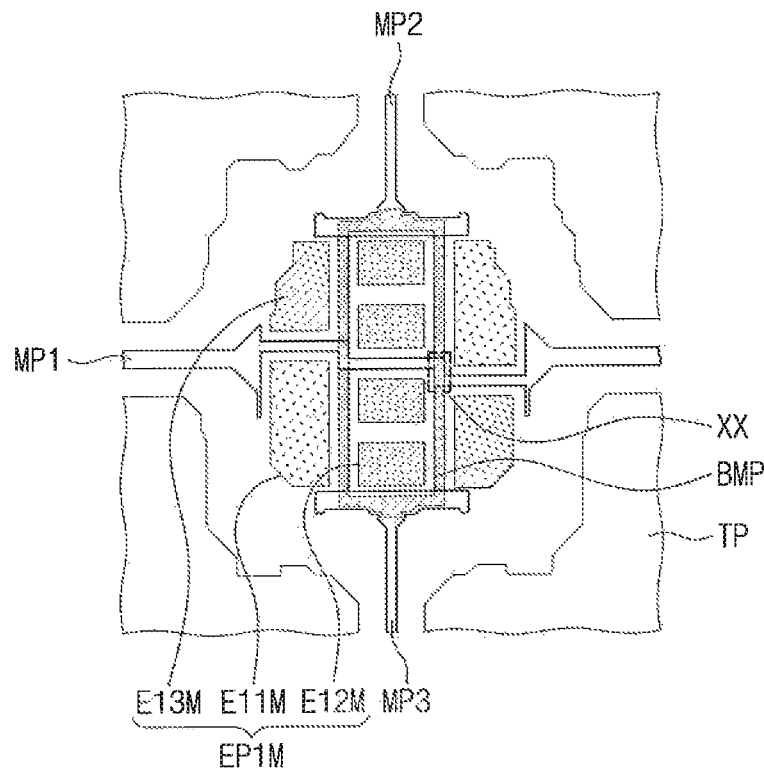
Figure 9C:
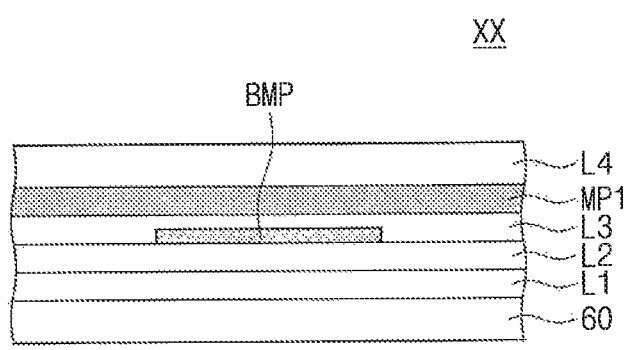
FIG. 9C is a sectional view of a region XX' of FIG. 9B.

FIG. 8 is a plan view illustrating a region of an electronic panel according to an embodiment of the inventive concept. FIGS. 9A and 9B are enlarged plan views illustrating a region of FIG. 8. FIG. 9C is a sectional view of a region XX' of FIG. 9B. In FIG. 8, emission parts EP1M and EP2M, mesh lines MS1 and MS2, and the transmission parts TP are illustrated and other elements are omitted, for convenience in illustration. Regions, which correspond to portions of the first and second regions A1 and A2, are illustrated in FIG. 9A, and a portion of the first region A1, in which a connecting portion or a bridge is disposed, is illustrated in FIG. 9B. Hereinafter, an embodiment of the inventive concept will be described with reference to FIGS. 8, 9A, 9B, and 9C.

As shown in FIG. 8, the mesh lines MS1 and MS2 constituting the input sensor may be disposed between the emission parts EP1M and EP2M. Each of the mesh lines MS1 and MS2 may form a plurality of openings, which are respectively overlapped with the emission parts EP1M and EP2M (in particular, the sub-light-emitting patterns E11M, E12M, E13M, E21M, E22M, and E23M). The mesh lines MS1 and MS2 may be formed in a shape surrounding the sub-light-emitting patterns E11M, E12M, E13M, E21M, E22M, and E23M or in a mesh shape.

The first and second mesh lines MS1 and MS2, which are respectively disposed in the first and second regions A1 and A2, may form openings of different sizes. Since, as described above, the sub-light-emitting patterns E11M, E12M, and E13M of the first region A1 have sizes and arrangements that are different from those of the sub-light-emitting patterns E21M, E22M, and E23M of the second region A2, the first mesh lines MS1 and the second mesh lines MS2 may have different shapes from each other.

For example, as shown in FIG. 8, the sub-light-emitting patterns E11M, E12M, and E13M of the first region A1 may be spaced apart from each other in the first direction DR1 and the second direction DR2, and the sub-light-emitting patterns E21M, E22M, and E23M of the second region A2 may be spaced apart from each other in a fourth direction DR4 and a fifth direction DR5. In other words, the sub-light-emitting patterns E21M, E22M, and E23M of the second region A2 may be arranged in a diagonal direction with respect to the sub-light-emitting patterns E11M, E12M, and E13M of the first region A1.

Accordingly, the first mesh lines MS1 may be composed of first conductive lines M11, which are extended in the first direction DR1, and second conductive lines M12, which are extended in the second direction DR2. The second mesh lines MS2 may be composed of third conductive lines M21, which are extended in the fourth direction DR4, and fourth conductive lines M22, which are extended in the fifth direction DR5. Thus, the first mesh lines MS1 and the second mesh lines MS2 may have extension directions that are different from each other. However, this is just an example, and the inventive concept is not limited to this example or a specific embodiment. For example, depending on the arrangement structure of the sub-light-emitting patterns E11M, E12M, E13M, E21M, E22M, and E23M, the first mesh lines MS1 and the second mesh lines MS2 may be composed of conductive lines extended in the same direction.

According to an embodiment of the inventive concept, the conductive lines M11 and M12 constituting the first mesh lines MS1 may have a relatively low density per a given area, compared with the conductive lines M21 and M22 constituting the second mesh lines MS2. Thus, the mesh lines MS1 disposed in the first region A1 may have a relatively small sensing area, compared with the mesh lines MS2 disposed in the second region A2, and in this case, by using the afore-described third conductive pattern as a sensing area, it is possible to prevent a reduction of the sensitivity in the first region A1.

The first mesh lines MS1 may be formed to surround the transmission parts TP. In an embodiment, the first mesh lines MS1 may be disposed such that they are not overlapped with the transmission parts TP, and in this case, the optical transmittance of the first region A1 may be improved. The first mesh lines MS1 may have a larger width than the second mesh lines MS2, as shown in FIGS. 8 and 9A. In detail, a linewidth LD_1 of one of the first mesh lines MS1 may be relatively larger than a linewidth LD_2 of one of the second mesh lines MS2. Accordingly, even when the first mesh lines MS1 form relatively large openings, compared with the second mesh lines MS2, it is possible to prevent the sensing area from being excessively reduced.

TABLE 2

|  | Cm (fF) | dCm (fF) |
|---|---|---|
| Linewidth of second mesh line is 4 μm | 490 | 74 |
| Linewidth of first mesh line is 4 μm | 290 | 39 |
| Linewidth of first mesh line is 5 μm | 318 | 42 |
| Linewidth of first mesh line is 6 μm | 337 | 43 |
| Linewidth of first mesh line is 7 μm | 360 | 45 |
| Linewidth of first mesh line is 8 μm | 377 | 46 |
| Linewidth of first mesh line is 10 μm | 411 | 49 |

Variations of the capacitance (Cm) and the capacitance variation (dCm), caused by the linewidth of the mesh line, are summarized in Table 2. Referring to Table 2, as the linewidth LD_1 of the first mesh line is increased beyond the linewidth LD_2 of the second mesh line, there is an increased change in the capacitance (Cm) and the capacitance variation (dCm) but there is no substantial difference in improvement between the sensitivities in the first and second regions A1 and A2. In an embodiment, the linewidth LD_1 of the first mesh line MS1 may be smaller than a distance WD_1 between the sub-light-emitting patterns E11M, E12M, and E13M and may be larger than the linewidth LD_2 of the second mesh line MS2. For example, the linewidth LD_1 of the first mesh line MS1 may range from 5 μm to 10 μm, but the inventive concept is not limited to this example. In an embodiment, the linewidth LD_2 of the second mesh line MS2 may be smaller than a distance WD_2 between the sub-light-emitting patterns E22M, E21M and E23M.

According to an embodiment of the inventive concept, since the mesh line in the first region A1 has a linewidth larger than that in the second region A2, it is possible to suppress a reduction of the sensitivity in the first region A1 and to realize uniform sensitivity throughout the active region.

As shown in FIGS. 9A, 9B and 9C, an intersection region of the first and second sensing electrodes may be positioned in the first region A1. For example, a first pattern MP1 may constitute the first sensing electrode, and a second pattern MP2 and a third pattern MP3 may constitute the second sensing electrode. The first pattern MP1, the second pattern MP2, and the third pattern MP3 may be connected to each other by a plurality of mesh lines and may be provided in the form of a single object.

The first pattern MP1 may be a structure, in which sensing parts and a connecting portion are provided as a single object. The first pattern MP1, the second pattern MP2, and the third pattern MP3 may be disposed on the same layer and may be simultaneously formed by a single process.

The second pattern MP2 and the third pattern MP3 may be electrically connected to each other through a connection pattern BMP. The connection pattern BMP may have a rectangular shape and be provided between the second pattern MP2 and the third pattern MP3. The connection pattern BMP may be disposed on a layer, which is different from the second pattern MP2 and the third pattern MP3, and may cross the first pattern MP1 in an insulated manner when viewed in a plan view. In the present embodiment, the connection pattern BMP is illustrated with a hatching pattern, for convenience in illustration. In addition, in the present embodiment, the first to third patterns MP1, MP2, and MP3 are illustrated to be disposed between a third layer L3 and a fourth layer L4, and the connection pattern BMP is disposed to be disposed between a second layer L2 and the third layer L3. The first to fourth layers L1, L2, L3, and L4 may be insulating layers, which are sequentially stacked on the sixth insulating layer 60 used here as an encapsulation layer to constitute the input sensor.

In the present embodiment, the connection pattern BMP may not be overlapped with the emission parts, when viewed in a plan view. For example, the connection pattern BMP may have a shape corresponding to a portion of the mesh line. However, this is just an example, and the inventive concept is not limited to this example or a specific embodiment. For example, if the connection pattern BMP can electrically connect the second pattern MP2 to the third pattern MP3, it may be designed in various shapes, and the first region A1 may be provided at a region at which the first and second sensing electrodes not cross each other.

Figure 10:
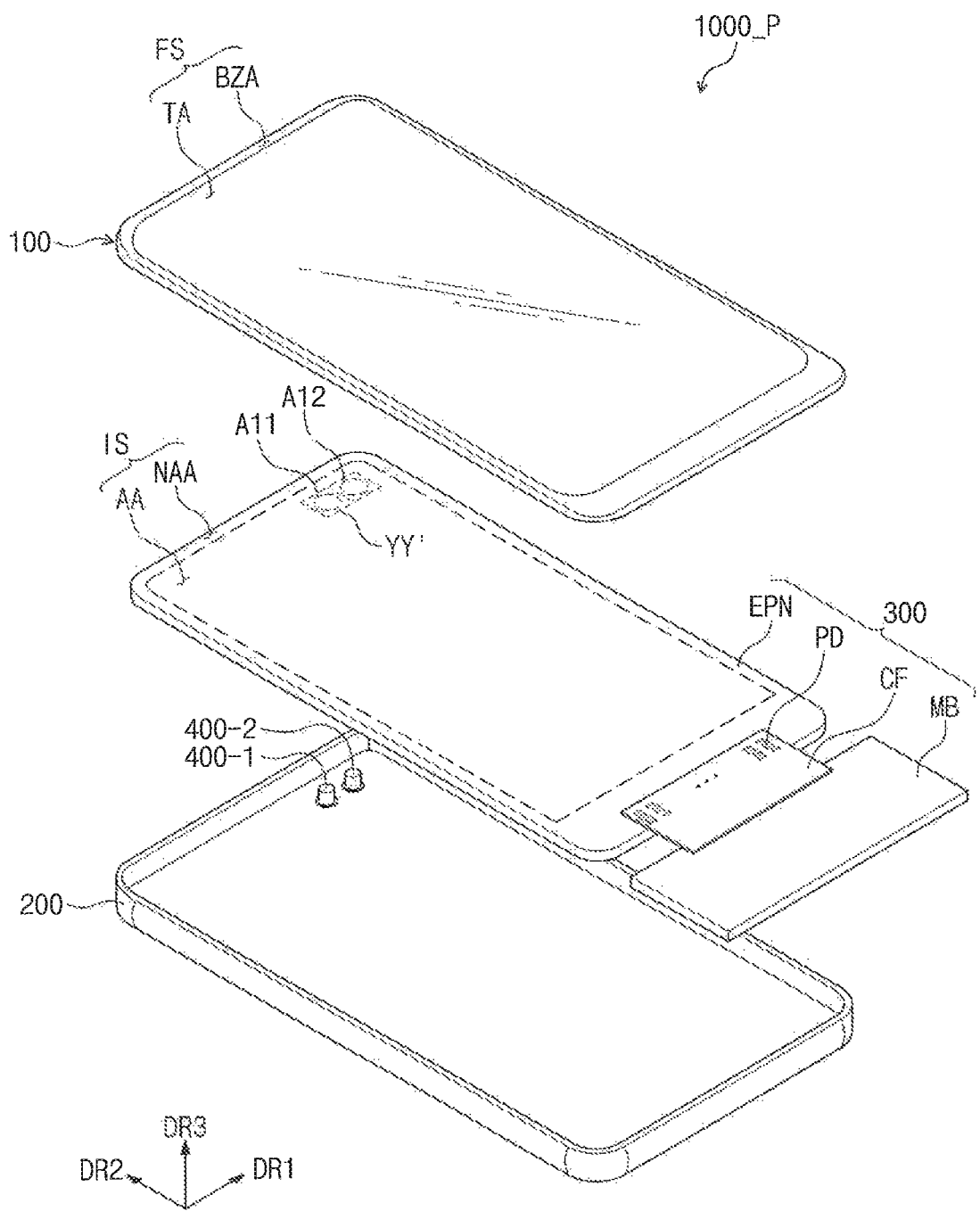
FIG. 10 is an exploded perspective view illustrating an electronic apparatus according to an embodiment of the inventive concept.

FIG. 10 is an exploded perspective view illustrating an electronic apparatus according to an embodiment of the inventive concept. FIG. 1I is a plan view of a region YY' of FIG. 10. Hereinafter, an embodiment of the inventive concept will be described with reference to FIGS. 10 and 11. In the following description, an element described with reference to FIGS. 1 to 9 may be identified by the same reference number without repeating an overlapping description thereof, for the sake of brevity. It is to be understood that the notation for the elements shown in FIG. 11 is similar to that in the figures described above, except that FIG. 11 includes a "_P" indicator.

As shown in FIG. 10, an electronic apparatus 1000_P may further include a flexible circuit board CF and a main circuit board MB. The flexible circuit board CF may be connected to the electronic panel EPN. The flexible circuit board CF may electrically connect the electronic panel EPN to the main circuit board MB. The flexible circuit board CF may be provided in the form of a tape carrier package (TCP) or a chip-on-film (COF), but the inventive concept is not limited to these examples.

The flexible circuit board CF may be coupled to pads PD which are formed on the electronic panel EPN. The flexible circuit board CF may be configured to send electrical signals to the electronic panel EPN through the pads PD. The electrical signals may be generated by the flexible circuit board CF or by the main circuit board MB. The electrical signals may include signals, which are used to drive the display panel 310 (e.g., see FIG. 2B) and the input sensor 320 (e.g., see FIG. 2B), respectively.

The main circuit board MB may be electrically connected to the electronic panel EPN through the flexible circuit board CF. However, this is just an example, and in an embodiment, the main circuit board MB may be directly connected to the electronic panel EPN. The main circuit board MB may provide an electrical signal to the electronic panel EPN. The electrical signal may be generated by the main circuit board MB. The electrical signal may include signals, which are used to drive the display panel 310 (e.g., see FIG. 2B) and/or the input sensor 320 (e.g., see FIG. 2B). However, this is just an example, and the inventive concept is not limited to this example. For example, the electronic apparatus 1000_P may be provided to have the same structure as the electronic panel EPN shown in FIG. 2A.

As shown in FIG. 10, the electronic apparatus 1000_P may include a plurality of electronic modules 400-1 and 400-2, compared with the electronic apparatus 1000 of FIG. 2. Accordingly, the active region AA may include a plurality of first regions A11 and A12.

Figure 11:
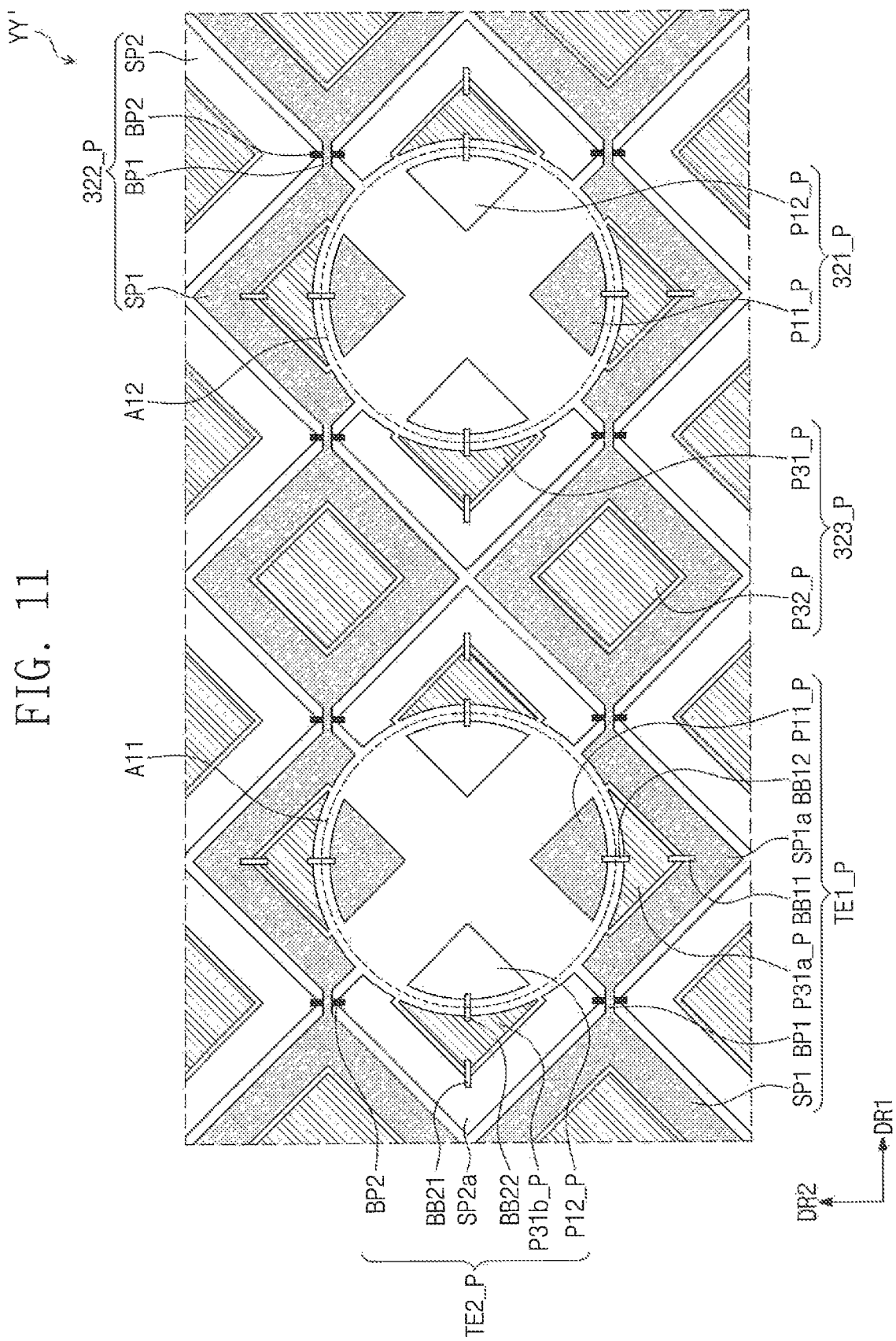
FIG. 11 is a plan view of a region YY' of FIG. 10.

Referring to FIG. 11, the first regions A11 and A12 may be spaced apart from each other in the first direction DR1. A portion of a first sensing electrode TE1_P or a portion of a second sensing electrode TE2_P may be disposed between the first regions A11 and A12. Each of the first and second sensing electrodes TE1_P and TE2_P may include a portion of a first conductive pattern 321_P, a portion of a second conductive pattern 322_P, and a portion of a third conductive pattern 323_P. The third conductive pattern 323_P may include a plurality of first patterns P31_P and a plurality of second patterns P32_P. Each of the first patterns P31_P of the third conductive pattern 323_P may be electrically connected to a corresponding adjacent one of the first conductive patterns 321_P. Each of the second patterns P32_P of the third conductive pattern 323_P may be electrically disconnected from the first and second sensing electrodes TE1_P and TE2_P.

In detail, the first sensing electrode TE1_P may include a first pattern P11_P of the first conductive pattern 321_P, the first sensing parts SP1 and SP1a of the second conductive pattern 322_P, the first connecting portions BP1, and a first pattern P31a_P of the third conductive pattern 323_P. The connection portions BB11 and BB12 may connect the first pattern P31a_P of the third conductive pattern 323_P to the first sensing parts SP1 and SP1a and the first pattern P11_P, respectively. The second sensing electrode TE2_P may include a third pattern P12_P of the first conductive pattern 321_P, the second sensing parts SP2 and SP2a of the second conductive pattern 322_P, the second connecting portions BP2, and a first pattern P31b_P of the third conductive pattern 323_P. The connection portions BB21 and BB22 may connect the first pattern P31b_P of the third conductive pattern 323_P to the second sensing parts SP2 and SP2*a* and the third pattern P12_P, respectively.

According to an embodiment of the inventive concept, even when the plurality of first regions A11 and A12 are provided, it is possible to prevent or suppress the touch sensitivity from being deteriorated in the first regions A11 and A12, because the third conductive pattern 323_P is designed as parts of the sensing electrodes TE1_P and TE2_P. Accordingly, the electronic apparatus 1000P may be provided to have a uniform sensitivity property throughout the active region AA.

A transmission region is defined in an active region, and here, according to an embodiment of the inventive concept, it is possible to prevent a sensing unit, which is used to sense an external input, from having lowered sensitivity in the transmission region. In addition, it is possible to provide a sensing region having uniform sensitivity throughout the entire active region including the transmission region.

While example embodiments of the inventive concept have been particularly shown and described, it will be understood by one of ordinary skill in the art that variations in form and detail may be made thereto without departing from the spirit and scope of the inventive concept as set forth in claiming scope.

What is claimed is:

1. An electronic apparatus, comprising:
   an electronic module;
   a display panel divided into a first region overlapped with the electronic module and a second region adjacent to the first region, when viewed in a plan view, the display panel including a plurality of first emission parts, which are disposed in the first region and are spaced apart from each other, and a plurality of second emission parts, which are disposed in the second region and are spaced apart from each other; and
   an input sensor including a first electrode, which is disposed on the first region, a second electrode, which is disposed on the second region, a third electrode, which is disposed on the second region and is electrically disconnected from the second electrode, and a plurality of conductive patterns, which are disposed on the second region and are spaced apart from each other,
   wherein the plurality of conductive patterns are spaced apart from the second electrode and the third electrode, and
   wherein the conductive patterns comprise a first pattern, which is electrically connected to the first electrode, and a second pattern, which is in an electrically floated state,
   wherein the first electrode is electrically connected to the second electrode,
   wherein the input sensor further comprises a fourth electrode, which is disposed on the first region and is electrically disconnected from the first electrode, and
   the fourth electrode is electrically connected to the third electrode.

2. An electronic apparatus, comprising:
   an electronic module;
   a display panel divided into a first region overlapped with the electronic module and a second region adjacent to the first region, when viewed in a plan view, the display panel including a plurality of first emission parts, which are disposed in the first region and are spaced apart from each other, and a plurality of second emission parts, which are disposed in the second region and are spaced apart from each other; and
   an input sensor including a first electrode, which is disposed on the first region, a second electrode, which is disposed on the second region, a third electrode, which is disposed on the second region and is electrically disconnected from the second electrode, and a plurality of conductive patterns, which are disposed on the second region and are spaced apart from each other,
   wherein the first electrode is electrically connected to the second electrode,
   wherein the conductive patterns comprise a first pattern, which is electrically connected to the first electrode, and a second pattern, which is in an electrically floated state,
   wherein the input sensor comprises a fourth electrode, which is disposed on the first region and is electrically disconnected from the first electrode, and
   the fourth electrode is electrically connected to the third electrode.

3. The electronic apparatus of claim 2, wherein the first electrode and the fourth electrode cross each other, when viewed in the plan view.

4. The electronic apparatus of claim 1, wherein the first emission parts have a different size from the second emission parts, when viewed in the plan view.

5. The electronic apparatus of claim 4, wherein a size of at least one of the first emission parts is larger than a size of at least one of the second emission parts.

6. The electronic apparatus of claim 2, wherein the first emission parts and the second emission parts have different arrangements.

7. The electronic apparatus of claim 6, wherein the first emission parts are spaced apart from each other in a first direction and a second direction different from the first direction, and
   the second emission parts are spaced apart from each other in a third direction, which is different from the first and second directions, and in a fourth direction, which is different from the first, second and third directions.

8. The electronic apparatus of claim 1, further comprising a plurality of transmission parts, which are disposed in the first region and are spaced apart from the first emission parts,
   wherein the transmission parts have a higher transmittance than the first emission parts.

9. An electronic apparatus, comprising:
   an electronic module;
   a display panel divided into a first region overlapped with the electronic module and a second region adjacent to the first region, when viewed in a plan view, the display panel including a plurality of first emission parts, which are disposed in the first region and are spaced apart from each other, and a plurality of second emission parts, which are disposed in the second region and are spaced apart from each other; and
   an input sensor including a first electrode, which is disposed on the first region, a second electrode, which is disposed on the second region, a third electrode, which is disposed on the second region and is electrically disconnected from the second electrode, and a plurality of conductive patterns, which are disposed on the second region and are spaced apart from each other,
   wherein the conductive patterns comprise a first pattern, which is electrically connected to the first electrode, and a second pattern, which is in an electrically floated state, wherein the first electrode comprises first mesh lines including a plurality of openings, wherein the openings are overlapped with the first emission parts, respectively, the second electrode comprises second mesh lines including a plurality of openings, wherein the openings of the second mesh lines are overlapped with the second emission parts, respectively, and the openings of the first mesh lines are larger than the openings of the second mesh lines.

10. The electronic apparatus of claim 9, wherein a linewidth of each of the first mesh lines is larger than a linewidth of each of the second mesh lines.

11. The electronic apparatus of claim 10, wherein the second electrode comprises a first pattern, which is adjacent to the first region, and a second pattern, which is spaced apart from the first region and has an area larger than the first pattern, and a plurality of cut portions are included in the second pattern but not in the first pattern.

* * * * *